US012561825B2

(12) United States Patent
Troy

(10) Patent No.: US 12,561,825 B2
(45) Date of Patent: Feb. 24, 2026

(54) SYSTEMS AND METHODS FOR DETERMINING A LOCATION OF A MOBILE INSPECTION PLATFORM

(71) Applicant: THE BOEING COMPANY, Arlington, VA (US)

(72) Inventor: James J. Troy, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 401 days.

(21) Appl. No.: 18/295,439

(22) Filed: Apr. 4, 2023

(65) Prior Publication Data

US 2024/0161329 A1 May 16, 2024

Related U.S. Application Data

(60) Provisional application No. 63/383,970, filed on Nov. 16, 2022.

(51) Int. Cl.
| | |
|---|---|
| *G06T 7/70* | (2017.01) |
| *G01S 17/89* | (2020.01) |
| *G05D 1/00* | (2006.01) |

(52) U.S. Cl.
CPC .............. *G06T 7/70* (2017.01); *G01S 17/89* (2013.01); *G05D 1/0246* (2013.01)

(58) Field of Classification Search
USPC ....................................................... 382/103
See application file for complete search history.

(56) References Cited

U.S. PATENT DOCUMENTS

| | | | |
|---|---|---|---|
| 7,859,655 B2 | 12/2010 | Troy et al. | |
| 11,401,051 B2 | 8/2022 | Shapoury et al. | |
| 2009/0086199 A1* | 4/2009 | Troy ...................... | G01S 7/497 |
| | | | 356/251 |
| 2019/0256226 A1* | 8/2019 | Shapoury .................. | G06T 7/73 |
| 2022/0187428 A1* | 6/2022 | Liaqat ..................... | G01S 17/89 |

FOREIGN PATENT DOCUMENTS

| | | |
|---|---|---|
| CN | 113450475 A | 9/2021 |

OTHER PUBLICATIONS

Extended European Search Report mailed Mar. 15, 2024 for EP 23206809.8 (10 pages).
Car Marko et al. "Autonomous Wind-Turbine Blade Inspection Using LiDAR-Equipped Unmanned Aerial Vehicle", IEEE, USA, Jul. 16, 2020 XP011800881.

(Continued)

*Primary Examiner* — Jacky X Zheng
(74) *Attorney, Agent, or Firm* — Joseph M. Butscher; Carroll, Hoette & Butscher, LLC

(57) ABSTRACT

Examples of the present disclosure provide localization systems and methods that detect a plurality of landmarks in scan data acquired by a scanning sensor disposed onboard a mobile inspection platform. The localization systems and methods determine, via one or more processors, centers of the landmarks based on scan points in the scan data that impinge perimeter surfaces of the landmarks, and determine a location of the mobile inspection platform in relation to the centers of the landmarks.

20 Claims, 17 Drawing Sheets

400

402 Group scan points into different groups based on proximity

404 Convert the scan points in each group into line segment(s)

406 Determine parallel line segments

408 Determine occlusion state based on number of parallel line segments

410 Match the parallel line segments to designated patterns associated with different regions in the environment 412 Determine offsets based on the best-matching pattern 414 Apply the offsets to midpoints of the line segments to determine the centers of the reference landmarks

(56) References Cited

OTHER PUBLICATIONS

Rice Mark et al., "Automating the Visual Inspection of Aircraft", Feb. 28, 2018, XP093042578, https://oar.a-star.edu.sg/storage/w/wxyqzqwwqx/automating-the-visual-inspection-of-aircraft-1.pdf, retrieved on Apr. 26, 2023.

Igor Jovancevic, "Exterior inspection of an aircraft using a Pan-Tilt-Zoom camera and a 3D scanner moved by a mobile robot: 2D image processing and 3D point cloud analysis" Nov. 21, 2026, pp. 1-215, XP055621853, Toulouse, France, https://tel.archives-ouvertes.fr/tel-01687831/file/jouvancevicigordiff.pdf, retrieved on Sep. 12, 2019.

* cited by examiner

101

400

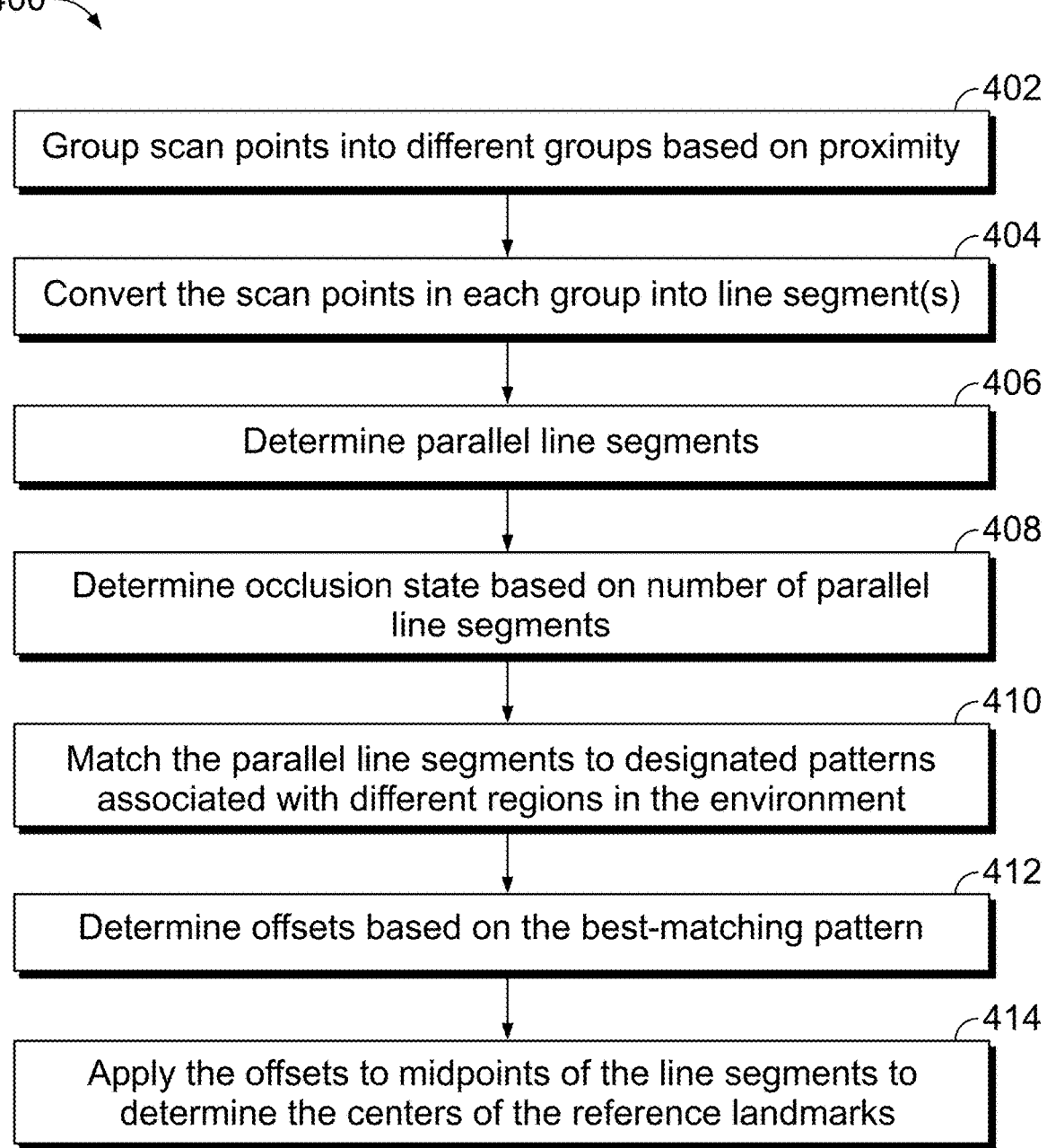

402

Group scan points into different groups based on proximity

404

Convert the scan points in each group into line segment(s)

406

Determine parallel line segments

408

Determine occlusion state based on number of parallel line segments

410

Match the parallel line segments to designated patterns associated with different regions in the environment

412

Determine offsets based on the best-matching pattern

414

Apply the offsets to midpoints of the line segments to determine the centers of the reference landmarks

FIG. 13

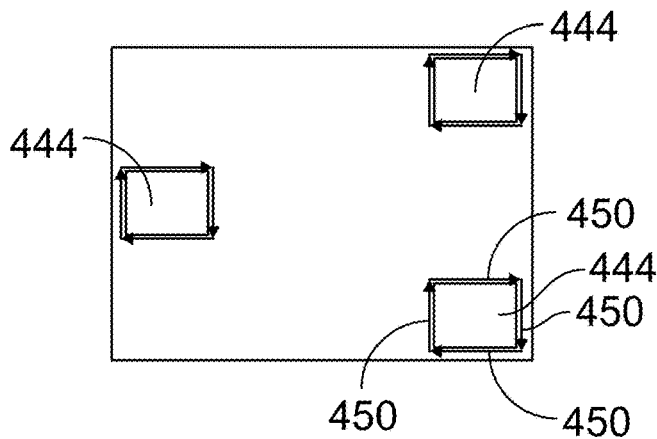
*Vector directions for edge lines*
*(for all possible edge lines)*
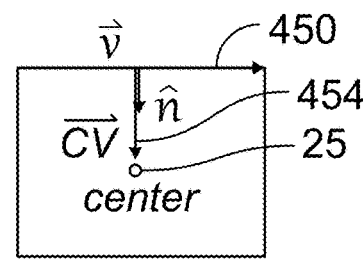
FIG. 18
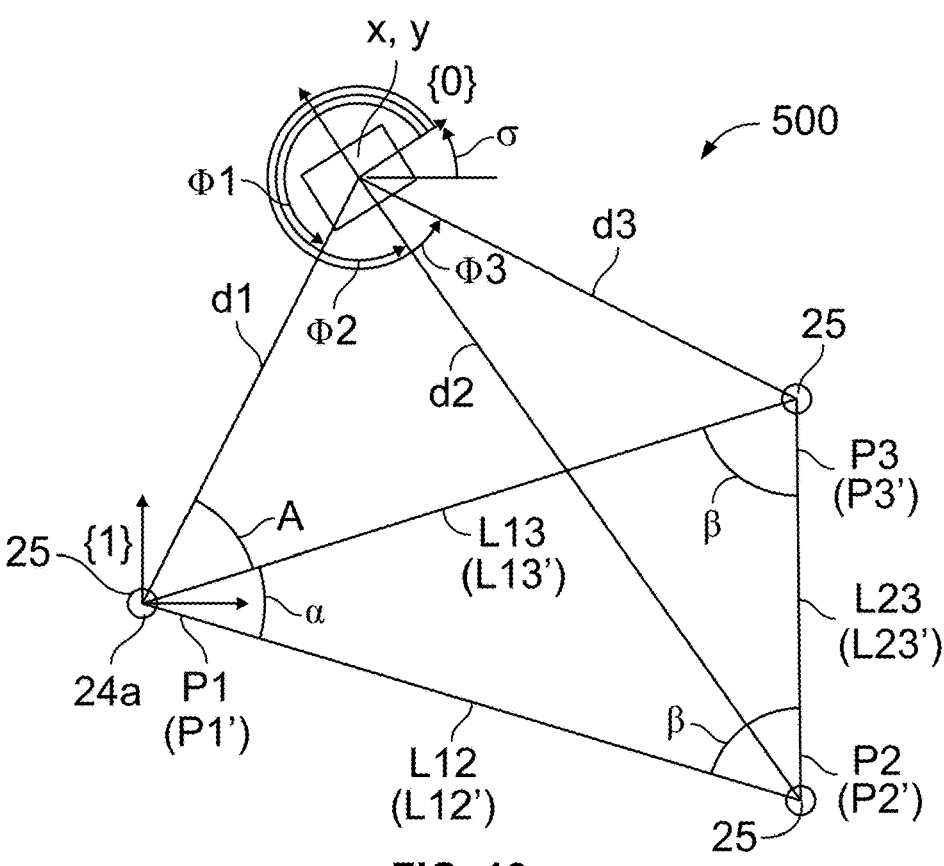
FIG. 19

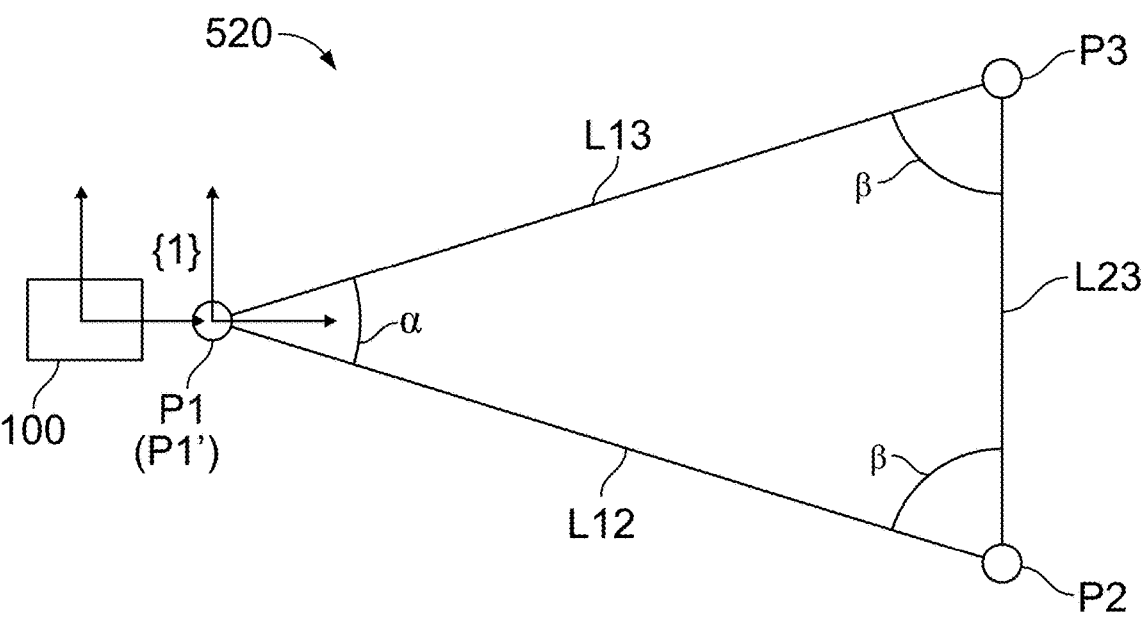
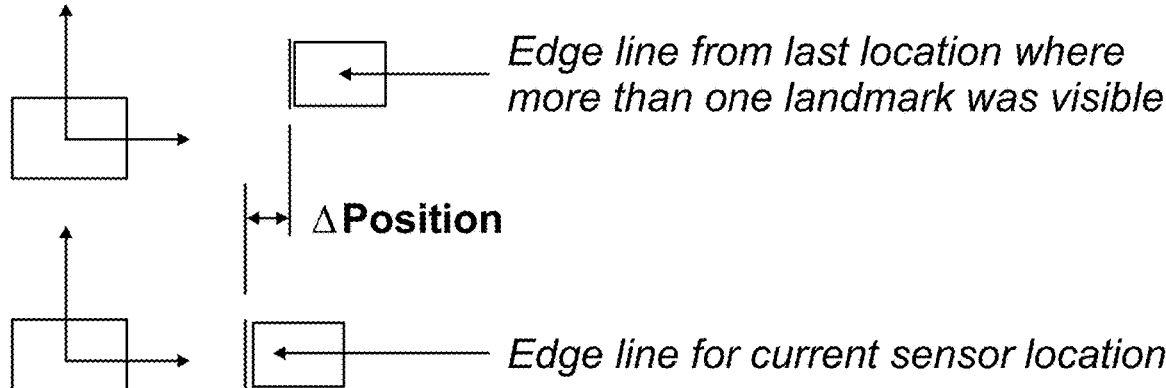
Edge line from last location where more than one landmark was visible
ΔPosition
Edge line for current sensor location
FIG. 21

Center finding method using the intersection of perpendicular bisector of lines from 3 of the scanned points
(widely spaced as possible)

SYSTEMS AND METHODS FOR DETERMINING A LOCATION OF A MOBILE INSPECTION PLATFORM

CROSS-REFERENCE TO RELATED APPLICATIONS

This application is a non-provisional conversion of, and claims priority to, U.S. Provisional Patent Application No. 63/383,970, filed Nov. 16, 2022, which is incorporated by reference in its entirety.

FIELD OF THE DISCLOSURE

Examples of the present disclosure generally relate to localization systems and methods, such as self-contained localization systems that use environmental landmarks.

BACKGROUND OF THE DISCLOSURE

Before an aircraft departs an airport, various components of the aircraft, such as engines, control surfaces, landing gear, and/or the like, are inspected to ensure that components are properly functioning, as well as to address required safety inspection procedures. The inspection includes at least external observation of the components, and may include testing, such as chemical analysis of fluids. The inspection may be manual, in which a pilot and/or ground crew walk around the aircraft to perform numerous visual inspections of various components of the aircraft. The manual process of visually inspecting various components of an aircraft before a flight is time-consuming, and may be ergonomically challenging. For example, the fuselage of the aircraft may be too low to allow the inspector to easily view some of the aircraft components from underneath. Further, the inspection process may be susceptible to human error. For example, an individual may not be able to readily discern an actual status of one or more components of the aircraft, or perform historical comparisons between flights for potential gradually-occurring conditions. Further, inspection is also limited by manual methods and human interpretation, which are inherently subjective.

Automated inspection systems may use robotic mobile platforms to inspect various components of the aircraft pre-flight, instead of or in addition to manual visual inspection. Certain types of automated or robotic inspection systems perform location tracking for path-planning navigation purposes, as well as for association of location coordinates to various type of inspection data. Automated inspection systems that depend on location data often operate in environments where GPS signals are blocked by objects, such as the fuselage of an aircraft, or the roof/walls of an aircraft hangar. Thus, conventional means for location tracking, such as GPS, may not be available to the robotic mobile platforms that inspect aircraft. Certain types of tracking systems (that do not use GPS or differential GPS) require the presence of markers or tags placed in the environment and/or on parts of the aircraft in order to perform localization. These tracking systems require preparing the environment by placing markers on and/or near aircraft, which may be undesirable due to reduced inspection efficiency and increased cost.

SUMMARY OF THE DISCLOSURE

A need exists for an accurate and robust localization system and method that is not dependent on GPS, and does not require preparing the environment (such as placing markers or tags). The system and method described herein may be used as a stand-alone tracking capability and/or to augment other types of tracking. The system and method described herein may be used by a mobile inspection platform that performs inspection tasks on a target object, such as an aircraft.

With those needs in mind, certain embodiments of the present disclosure provide a localization method. The localization method includes detecting a plurality of landmarks in scan data acquired by a scanning sensor disposed onboard a mobile inspection platform. The method includes determining, via one or more processors, centers of the landmarks based on scan points in the scan data that impinge perimeter surfaces of the landmarks, and determining a location of the mobile inspection platform in relation to the centers of the landmarks.

Certain embodiments of the present disclosure provide a localization system that includes a scanning sensor and one or more processors. The scanning sensor is disposed on a mobile inspection platform and is configured to acquire scan data of a surrounding environment. The one or more processors are configured to analyze the scan data and detect a plurality of landmarks in the scan data. The one or more processors are configured to determine centers of the landmarks based on scan points in the scan data that impinge perimeter surfaces of the landmarks, and determine a location of the mobile inspection platform in relation to the centers of the landmarks.

Certain embodiments of the present disclosure provide a localization system that includes a scanning sensor and one or more processors. The scanning sensor is disposed on a mobile inspection platform and is configured to acquire scan data of a surrounding environment. The one or more processors are configured to detect a plurality of landmarks in the scan data based on scan points in the scan data that impinge perimeter surfaces of the landmarks. The one or more processors are configured to group the scan points into different groups based on proximity, convert the scan points in each group into one or more line segments, and determine a set of parallel line segments among the different groups. The one or more processors are configured to match the set of parallel line segments to a first designated pattern of multiple designated patterns associated with different regions in the surrounding environment, determine offsets based on the first designated pattern, and apply the offsets to mid-points of the one or more line segments to determine centers of the landmarks. The one or more processors are configured to determine a location of the mobile inspection platform in relation to the centers of the landmarks.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 13 illustrates a flow chart of a method to determine the centers of reference landmarks according to an embodiment of the present disclosure;

FIG. 18 illustrates shaded boxes of the reference landmarks with vector directions for all edge lines according to an embodiment;

FIG. 19 is a diagram for a localization process with three visible landmarks and zero occlusions;

FIG. 21 is a diagram for a localization process with one visible landmark and two occlusions;

DETAILED DESCRIPTION OF THE DISCLOSURE

Figure 1:
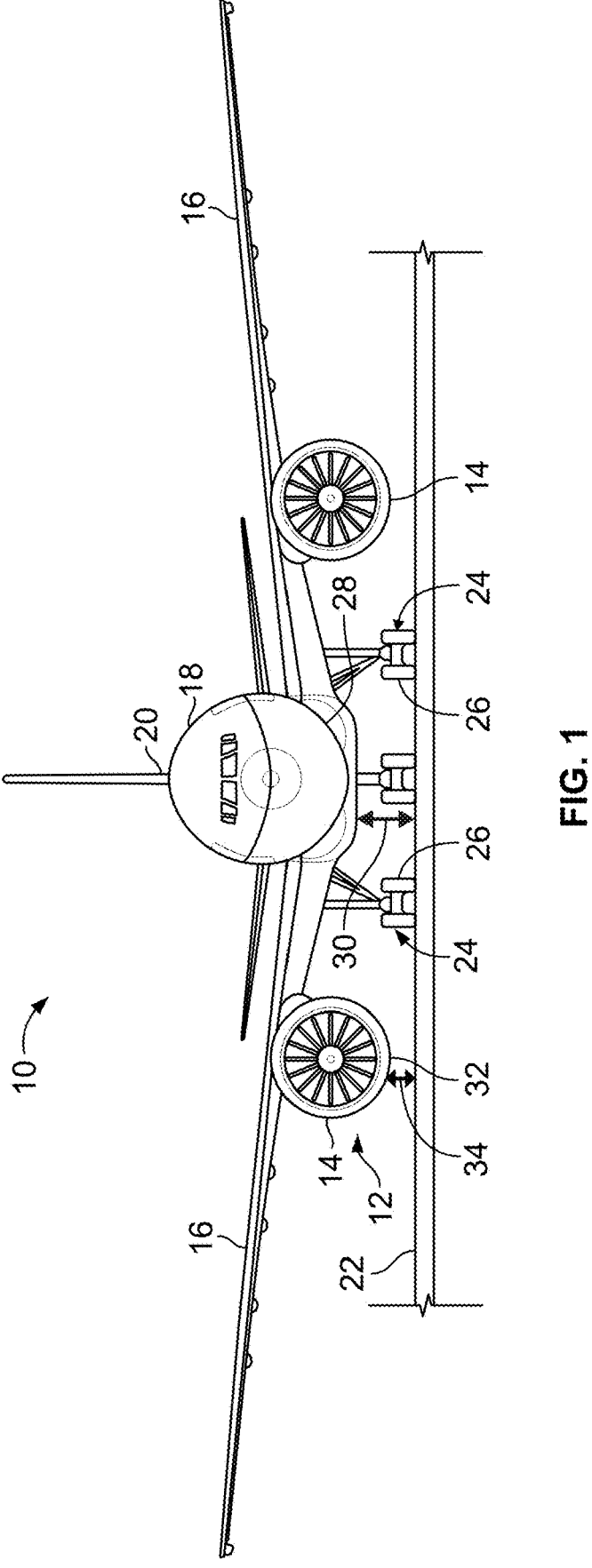
FIG. 1 is a diagrammatic representation of a front view of an aircraft, according to an embodiment of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

U.S. patent application Ser. No. 17/847,246 (the "'246 application"), entitled "Aircraft Inspection Systems and Methods," filed Jun. 23, 2022, is a continuation of U.S. patent application Ser. No. 15/898,724, entitled "Aircraft Inspection Systems and Methods," filed Feb. 19, 2018, now U.S. Pat. No. 11,401,051 (the "'051 patent"). The '051 patent discloses systems and methods for various components of in relation to an aircraft. U.S. Pat. No. 7,859,655 (the "'655 patent"), entitled "Method Involving a Pointing Instrument and a Target Object," discloses systems and methods that utilize pattern matching between known coordinate positions and measured feature coordinates. Each of the '246 application, the '051 patent, and the '655 patent is incorporated by reference herein in its entirety.

Examples of the present disclosure provide localization systems and methods that enable a ground-based mobile platform (also referred to herein as robot) to achieve uninterrupted position and orientation tracking under and around a parked aircraft for navigation and inspection purposes. The systems and methods provide real-time location tracking of the robot with respect to the aircraft, even in occluded locations. The systems and methods described herein provide real-time, stand-alone location (both position and orientation) tracking capability using reference landmarks detected in scan data acquired by one or more sensors. The one or more sensors that acquire the scan data may be distance-based measurement sensors. The reference landmarks may be portions of the aircraft. For example, the reference landmarks may be landing gear. In at least one example, the systems and methods determine landmark centers (e.g., respective center points of the reference landmarks) based on the scan data and known landmark reference data. The landmark reference data may include individual landing gear dimensions, arrangement of the landing gear, spacing between the landing gear, and/or the like. The systems and methods provide a robust localization process that handles various occlusion cases. The localization system and method described herein can be utilized in an automated inspection system that controls a ground-based mobile platform to inspect components of a stationary aircraft.

In at least one example, a method includes detecting a plurality of landmarks; determining centers of the plurality of landmarks; and determining a location of a sensor in relation to the centers of the plurality of landmarks. The landmarks may include landing gear of an aircraft.

FIG. 1 is a diagrammatic representation of a front view of an aircraft 10, according to an embodiment of the present disclosure. The aircraft 10 includes a propulsion system 12 that may include engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers and a vertical stabilizer.

On the ground (e.g., floor) 22, the aircraft 10 is supported by landing gear 24, which includes wheels 26. The lower portion 28 of the fuselage 18 may be at a lowermost height 30 above the ground 22 that may not allow individuals to easily walk underneath. Further, lower portions 32 of the engines 14 may be at lowermost heights 34 that may make it difficult for an individual to walk or inspect underneath.

As explained herein, embodiments of the present disclosure provide localization systems and methods that include a ground-based mobile inspection platform (e.g., inspection robot) that may inspect various components of the aircraft. The mobile inspection platform may be sized and shaped to be able to move and navigate in relation to various components of the aircraft 10, such as the engines 14, the landing gear 24, and the like, in order to inspect the various components.

Alternatively, instead of an aircraft, embodiments of the present disclosure may be used with various other vehicles, such as automobiles, buses, locomotives and train cars, seacraft, spacecraft, and/or the like.

Figure 2:
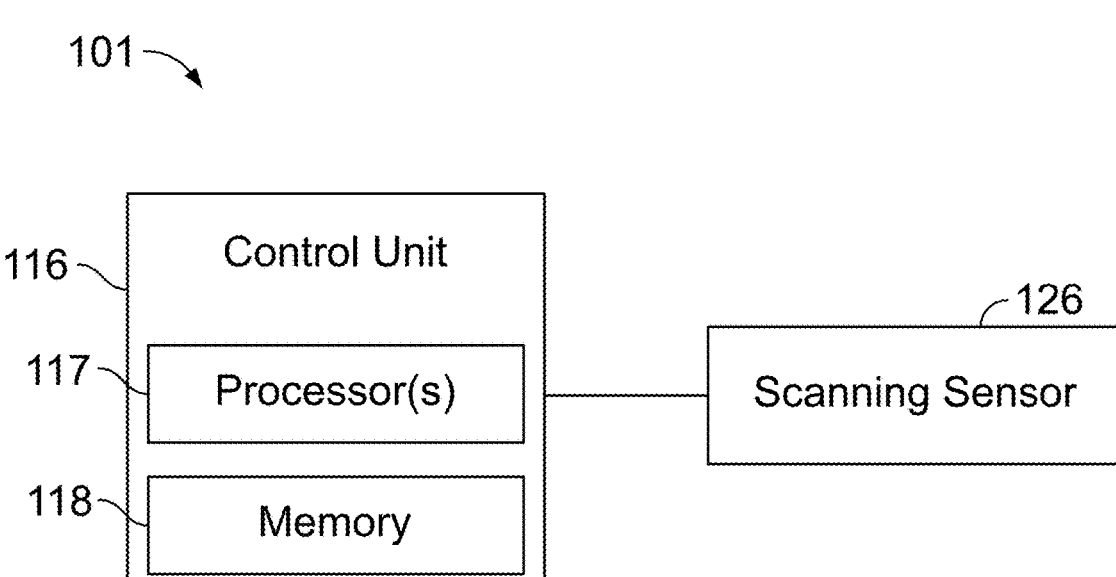
FIG. 2 is a schematic block diagram of a localization system according to an embodiment of the present disclosure.

FIG. 2 is a schematic block diagram of a localization system 101 according to an embodiment of the present disclosure. The localization system 101 includes a control unit 116 and at least one scanning sensor 126. The control unit 116 of the localization system 101 includes one or more processors 117 and a non-transitory computer-readable storage medium 118 (referred to herein as memory). The localization system 101 optionally may include additional components than shown in FIG. 2.

The scanning sensor 126 acquires scan data of the surrounding environment of the scanning sensor 126. Although only one scanning sensor 126 is described, the localization system 101 may include multiple scanning sensors 126 to acquire the scan data. The scanning sensor 126 is referred to herein as scanner 126. The scanner 126 may be a range sensor (e.g., distance-based measurement sensor). Example scanner types may include laser-based devices, such as light detection and ranging (LIDAR) sensors. The scanner 126 may be controlled to scan an area surrounding the scanner 126. For example, the control unit 116 may control the scanner 126 to emit laser energy in a 360 degree sweep of the environment to acquire the scan data. The scanner 126 may provide the control unit 116 with the scan data needed to compute a current location of the scanner 126 and/or mobile device relative to the target object, according to the localization process described herein. In an example, the target object may be the aircraft 10 shown in FIG. 1. The current location may refer to the position and orientation of the scanner 126 and/or a mobile platform that includes the scanner 126 relative to the target object. Determining the current location relative to the target object may enable the mobile platform to effectively move to expected locations of component of the target object and avoid collision with objects along the way to the expected locations. The components of the target object optionally may be aircraft components that the mobile device is tasked with inspecting.

The control unit 116 represents hardware circuitry that includes and/or is connected with one or more processors 117 (e.g., one or more microprocessors, integrated circuits, microcontrollers, field-programmable gate arrays, etc.). The control unit 116 is communicatively connected to the scanner 126 through a wired or wireless connection. For example, the control unit 116 receives the scan data acquired by the scanner 126 via the wired or wireless connection. The control unit 116 includes or is coupled to the memory 118, which stores instructions for operation of the control unit 116. The control unit 116 may implement the instructions stored in the memory 118 to perform the localization process described herein. Optionally, the control unit 126 may operate based on firmware installed within the one or more processors 117 instead or in addition to the programmed instructions in the memory 118.

The localization system 101 may be incorporated into a mobile device or robot (referred to herein as a mobile platform). The mobile platform could be a ground-based self-propelling robot, an automated guided vehicle (AGV), a robotic arm, an unmanned aerial vehicle (UAV) (e.g., drone), an autonomous underwater vehicle (AUV), another type of vehicle, or even a hand-held device such as a smartphone or tablet computer. The mobile platform may have the ability to move the localization system 101 relative to other objects, the ground, a floor, etc. Optionally, the localization system can be a self-contained module used as part of a system that includes a motion platform or other type of subsystem that provides motion control. For example, the localization system 101 may provide coordinate information (position and orientation) to the mobile platform's navigation system for controlling movement of the mobile platform. The localization system 101 may perform three-dimensional optical template matching or laser-based triangulation to locate various components and features of the aircraft 10.

Figure 3:
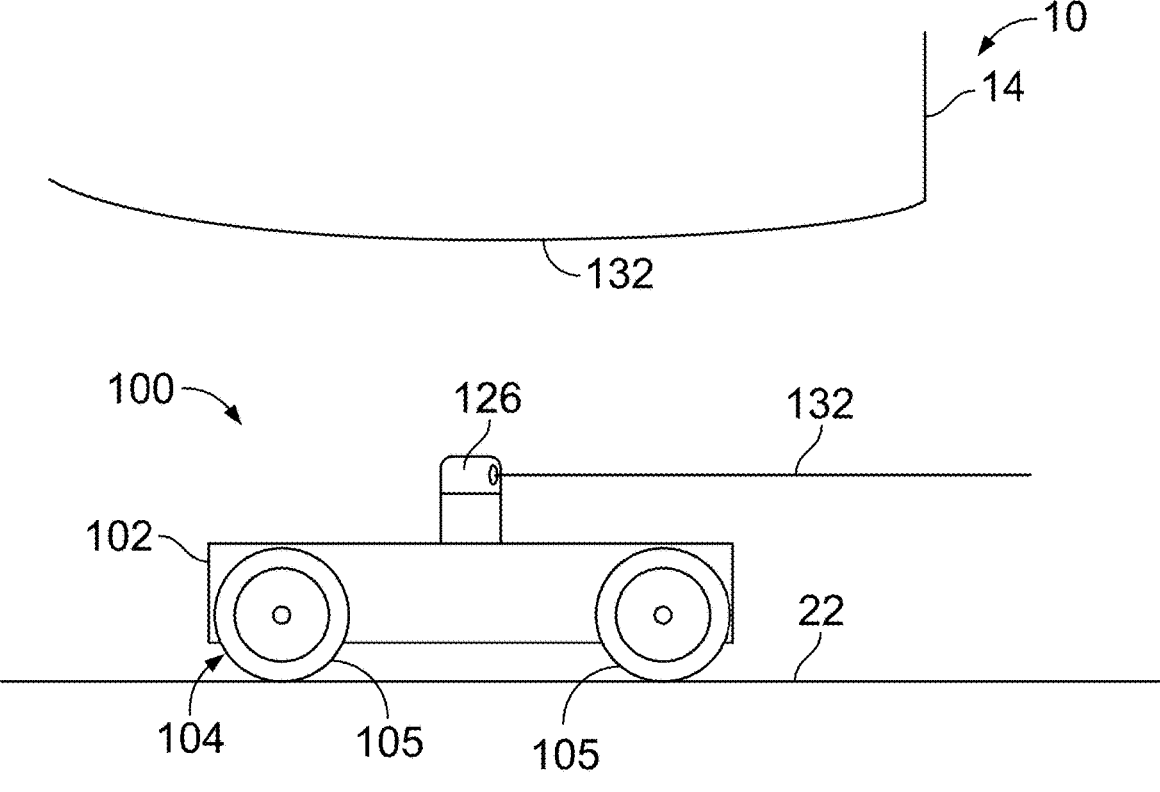
FIG. 3 is a simplified diagram of a side view of a mobile inspection platform underneath an engine of the aircraft, according to an embodiment of the present disclosure.

FIG. 3 is a simplified diagram of a side view of a mobile inspection platform 100 underneath an engine 14 of the aircraft 10, according to an embodiment of the present disclosure. In an embodiment, the localization system 101 shown in FIG. 2 may be incorporated into the mobile inspection platform 100. For example, the mobile inspection platform 100 represents one example type of platform on which the localization system 101 may be incorporated. The localization system 101 may be incorporated into other types of mobile platforms in other embodiments. The mobile inspection platform 100 may be a ground-based device that moves along the ground 22 underneath the engine 14, wings, fuselage, and/or the like of the aircraft 10. The mobile inspection platform 100 may travel relative to the aircraft 10 to approach target components based on information received from the localization system 101. The mobile inspection platform 100 optionally may also rely on other sensor data to avoid obstacles.

The mobile inspection platform 100 may include a base structure 102 that holds the localization system 101. The scanner 126 of the localization system 101 is shown projecting beyond a top of the base structure 102. The scanner 126 may be positioned and oriented to emit laser energy in a horizontal scan plane 132. The horizontal scan plane 132 may be parallel to the ground 22. The scanner 126 may perform a 360 degree sweep of the environment along the horizontal scan plane 132. The control unit 116 may control the scanner 126 to perform multiple scans over time from multiple different locations relative to the aircraft 10, or scanner 126 may be in continuous operation to perform scanning operations as the mobile inspection platform 100 is moving (or more generally, the scanner may perform scanning operations while there is relative motion between the target object (e.g. aircraft 10) and the mobile inspection platform 100. The mobile inspection platform 100 may also include a propulsion sub-system 104 for generating tractive effort to propel the mobile inspection platform 100 along the ground 22. The propulsion sub-system 104 may include one or more wheels 105 that apply tractive force on the ground 22. In an example, the scanner 126 is controlled to by the control unit 116 perform the scans while the mobile inspection platform 100 is stationary. Alternatively, the control unit 116 may control the scanner 126 to perform one or more scans while the mobile inspection platform 100 is moving relative to the ground 22.

In an example, the mobile inspection platform 100 may be a robotic device or machine that is able to propel itself to move along the ground or a floor. The mobile inspection platform 100 may control its own movement (e.g., direction of movement and speed) based on instructed tasks and detected obstructions in the environment. The instructed tasks may be inspection instructions that identify one or more components and/or locations of the aircraft 10 to inspect. The mobile inspection platform 100 may be sized and shaped to move underneath an aircraft. For example, the mobile inspection platform may be sufficiently short to move underneath the lower portion 28 of the fuselage 18 and the lower portions 32 of the engines 14. As such, the mobile inspection platform 100 may quickly and easily move between various components of the aircraft 10. In this manner, an individual person need not walk around and underneath the aircraft 10 to inspect the components of the aircraft.

Figures 4, 5:
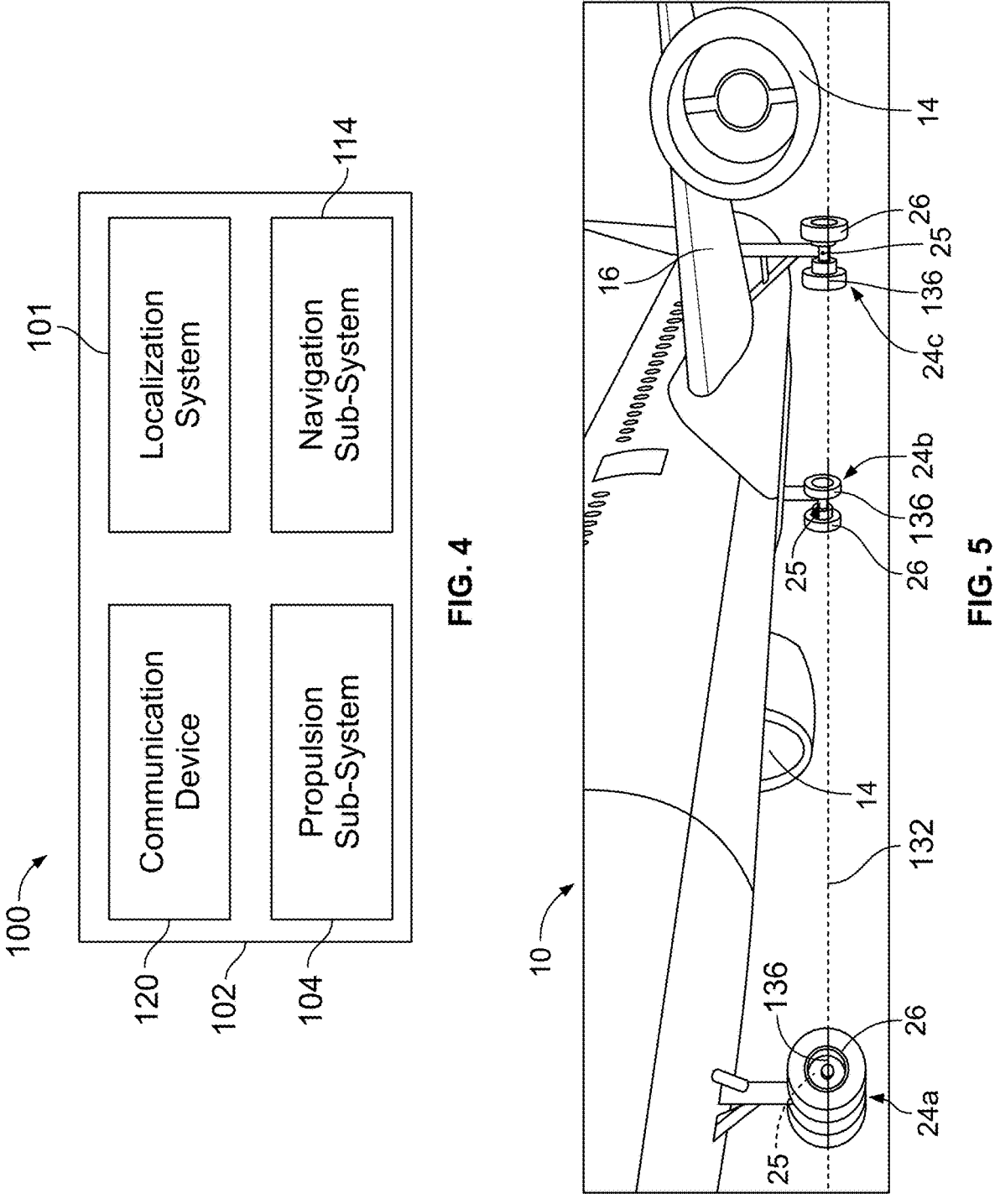
FIG. 4 is a schematic block diagram of the mobile inspection platform, according to an embodiment of the present disclosure.
FIG. 5 is a perspective rendering of a ground-level view of the aircraft, according to an embodiment of the present disclosure.

FIG. 4 is a schematic block diagram of the mobile inspection platform 100 according to an embodiment. The mobile inspection platform 100 may include the localization system 101, the propulsion sub-system 104, a navigation sub-system 114, and a communication device 120. These components may be communicatively connected to one another via wired or wireless communication pathways. The components may be installed on, and supported by, the base structure 102. The mobile inspection platform 100 optionally may include additional components and/or different components than the components shown in FIG. 4.

With additional reference to FIG. 3, the propulsion sub-system 104 may include a motor, engine, or the like that operates to propel the mobile inspection platform 100. The propulsion sub-system 104 may include one or more wheels 105, track(s), roller(s), moveable leg(s), hover device(s), and/or the like. The propulsion sub-system 104 may receive operating power from a power source, which is supported by the base structure 102. The primary power source may be one or more batteries, fuel tanks, inductive power transfer, and/or the like that are configured to provide operating power to the mobile inspection platform 100. The primary power source, or a different onboard power source, may power the communication device 120, the localization system 101, and/or the navigation sub-system 114.

The communication device 120 may include an antenna, transceiver, Wi-Fi antenna, and/or the like. The communication device 120 may allow the mobile inspection platform 100 to communicate (such as wirelessly) with remote systems and devices that are off-board the mobile inspection platform 100. For example, the mobile inspection platform 100 may wirelessly communicate with a remote monitoring station via the communication device 120. The remote monitoring station may be a control center, a dispatch facility, a remote server, or the like. In a first embodiment, the one or more processors 117 of the control unit 116 of the localization system 101 are all onboard the mobile inspection platform 100. In a second embodiment, at least some of the processor(s) 117 of the localization system 101 may be located off-board the mobile inspection platform 100. For example, one or more of the processors 117 may be disposed (e.g., located) at the remote monitoring station. As such, the localization system 101 may operate via communications between the mobile inspection platform 100 and the remote monitoring station using the communication device 120.

The navigation sub-system 114 determines the motion path for the mobile inspection platform 100 in relation to the surrounding environment. For example, the navigation sub-system 114 controls movement around the aircraft and surrounding areas. The navigation sub-system 114 may include one or more sensors. The navigation sub-system 114 may control the propulsion sub-system 104 by generating control signals that are transmitted to motors, actuators, steering systems, brake systems, or the like, of the propulsion sub-system 104. The navigation sub-system may operate based on location data received from the localization system 101. Knowledge of the current location, including position and orientation, of the mobile inspection platform 100 relative to the aircraft may enable the navigation sub-system 114 to effectively determine the motion path to move the mobile inspection platform 100 to areas of interest on or near the aircraft and avoid collision with objects along the way. The areas of interest may be associated with aircraft components that the mobile inspection platform 100 is tasked with inspecting.

The operations of the mobile inspection platform 100 can include movement, communications, alerts, inspection tasks, and/or the like. These operations are controlled by one or more processors of one or more controllers (e.g., control units). For ease of description, the control unit 116 of the localization system 101 is referred to herein as the control unit that controls the operations of the mobile inspection platform 100. However, the mobile inspection platform 100 may include multiple different control units that interact to perform the operations. For example, different systems and sub-systems may have separate processors.

The mobile inspection platform 100 optionally may include a sensing sub-system for inspecting one or more components of the aircraft. For example, the sensing sub-system may include one or more sensors that sense one or more characteristics (for example, features, attributes, anomalies, or the like related to structural, electrical, hydraulic, chemical integrity, and/or the like) of engines, wings, control surfaces, exterior surfaces, landing gear, and/or the like. The sensors may include one or more imaging devices (such as multispectral imaging devices, thermal imaging devices, infrared imaging devices, photographic imaging devices, or other such cameras, x-ray devices, ultrasonic devices, and/or the like), three-dimensional scanning sensors, luminescence sensors, hydrocarbon sensors, and/or the like.

Referring to FIGS. 2 and 4, the memory 118 of the localization system 101 may store reference data for one or more target objects (e.g. aircraft 10). In an example, the reference data may include landmark information that is used by the localization system 101 to determine the location of the scanner 126 and/or the mobile inspection platform 100 relative to the aircraft 10 (or other target object). The landmark information refers to reference landmarks. Example reference landmarks include landing gear. The landing gear landmark information may include the number of landing gear, dimensions of each landing gear, a configuration of the landing gear, spacing between the landing gear, and/or the like. The memory 118 may store landmark information for multiple different types of aircraft. The mobile inspection platform 100 may acquire information on the type of aircraft proximate to the mobile inspection platform 100. The processor(s) 117 may access the memory 118 to retrieve the landmark information specific to the type of aircraft (or other target object) proximate to the mobile inspection platform 100. The navigation sub-system 114 optionally may also use the reference data to navigate the area underneath the aircraft based on the location determined by the localization system 101. In a first embodiment, the memory 118 of the localization system 101 is onboard the mobile inspection platform 100, and the reference data is stored in the onboard memory 118. In a second embodiment, at least some of the reference data is offboard the mobile inspection platform 100. For example, the reference data may be stored remotely at the remote monitoring station. The communication device 120 may be used to request and receive the reference data from the remote monitoring station.

The mobile inspection platform 100 may collect data, such as images of the aircraft (or other target object), to be used for inspection, analysis, or documentation purposes. Optionally, the mobile inspection platform 100 may perform one or more inspection tasks on the aircraft. The inspection tasks may be scheduled to occur prior to a flight of the aircraft. Alternatively, the mobile inspection platform 100 may acquire data for off-board analysis of the data, without the mobile inspection platform 100 performing a pre- or post-flight inspection. The mobile inspection platform 100 may use the navigation sub-system 114 to move to the expected locations of various components of the aircraft for data acquisition. The propulsion sub-system 104 moves the mobile inspection platform 100 between the various locations to acquire data, as directed by the navigation sub-system 114. The sensing sub-system may sense various characteristics (e.g., properties) of the aircraft components. Data acquired by the sensors of the sensing sub-system may be stored in the memory 118 and/or sent to a remote monitoring station.

Optionally, the reference data may include prior inspection data of the aircraft that is stored from prior inspections. For example, the database 204 may store prior inspection data for various components of an aircraft generated during the prior inspections. The prior inspection data may include image data of the components, measurements of one or more parameters of the components, and/or the like. In another example, the reference data may include expected (e.g., prescribed) data relating to parameters and/or characteristics associated with properly-operating aircraft components. The sensing sub-system of the mobile inspection platform 100 may use the prior inspection data and/or expected data for comparison purposes during a current inspection task, to detect differences or deviations in any of the components over time and/or relative to expected operation and/or condition of the components.

The sensing sub-system may compare the inspection data from the mobile inspection platform 100 with the reference data stored in the memory 118 to determine if anomalies exist between the inspection data and the stored reference data. If anomalies exist, the control unit 116 (or a controller of the sensing sub-system) may output an alert signal to notify an operator. The alert signal may indicate that one or more aircraft components need further inspection. The alert signal may identify the one or more aircraft components that require further inspection. For example, the control unit 116 may output the alert signal via the communication device 120. The alert signal and/or inspection test results stemming from the inspection may be received by a flight computer and/or a handheld device (for example, a smart phone, tablet, or the like). The inspection test results may indicate the results of the various pre-flight inspection tests of the various components of the aircraft.

FIG. 5 is a perspective rendering of a ground-level view of the aircraft 10, according to an embodiment of the present disclosure. The mobile inspection platform 100 may operate in the environment under the aircraft 10. The aircraft 10 includes three landing gear 24a, 24b, and 24c. The landing gear 24a is proximate to the front of the aircraft 10 and is generally aligned with a central longitudinal axis of the aircraft 10. The landing gear 24b and 24c are located aft of the landing gear 24a, and are offset from the central longitudinal axis of the aircraft 10. The landing gear 24a is referred to herein as front landing gear 24a, and the landing gear 24b, 24c are referred to herein as first aft landing gear 24b and second aft landing gear 24c. The first aft landing gear 24b is disposed towards and/or under one wing 16, while the second aft landing gear 24c is disposed towards and under an opposite wing 16.

The landing gear 24 may be used by the localization system 101 as reference landmarks. The localization system 101 may rely on reference landmarks to solve for alignment between measured and known values, also referred to as solving the pose problem. The localization system 101 is designed to solve the pose problem between the mobile inspection platform 100 and the aircraft 10 to be inspected by the mobile inspection platform 100, for accurate navigating to and/or around components of the aircraft 10. Upon determining the location (e.g., position and orientation) of the mobile inspection platform 100 relative to the aircraft 10, the control unit 116 may control movement of the mobile inspection platform 100 to various predetermined locations on or near the aircraft 10 by way of the navigation sub-system 114. In an example, the predetermined locations may be associated with specific components of the aircraft 10 to be inspected. Although the landing gear 24 are used as the reference landmarks in the examples described herein, the localization system 101 optionally may use other components as reference landmarks either in addition to, or instead of, the landing gear 24.

In an embodiment, the localization system 101 determines respective centers of the reference landmarks in order to distill each reference landmark to a particular point position. The respective centers of the reference landmarks are collectively referred to herein as landmark center data. The localization system 101 may use the landmark center data to determine the location of the mobile inspection platform 100 (e.g., or the scanner 126 thereon) with respect to the aircraft, as described herein.

FIG. 5 shows the horizontal scan plane 132 along which the scanner 126 of the mobile inspection platform 100 emits laser energy to acquire scan data. For example, the horizontal scan plane 132 represents a path swept by the scanner 126. The laser energy is configured to impinge upon portions of the wheels 26 of the landing gear 24a-c. The horizontal scan plane 132 is below the engines 14, so the laser energy is not blocked by portions of the engines 14. The horizontal scan plane 132 includes portions 136 that intersect the landing gear 24a, 24b, and 24c. The scanner 126 is able to detect the landing gear 24a, 24b, 24c via the intersecting portions 136. Most of the intersecting portions 136 represent the laser energy impinging upon the wheels 26. The localization system 101 may use the data from the intersections 136, along with reference data concerning geometry (e.g., dimensions) and relative spacing of the landing gear 24, to determine respective centers 25 of the landing gear 24. The centers 25 refer to geometric center points of the landing gear 24.

Figure 6:
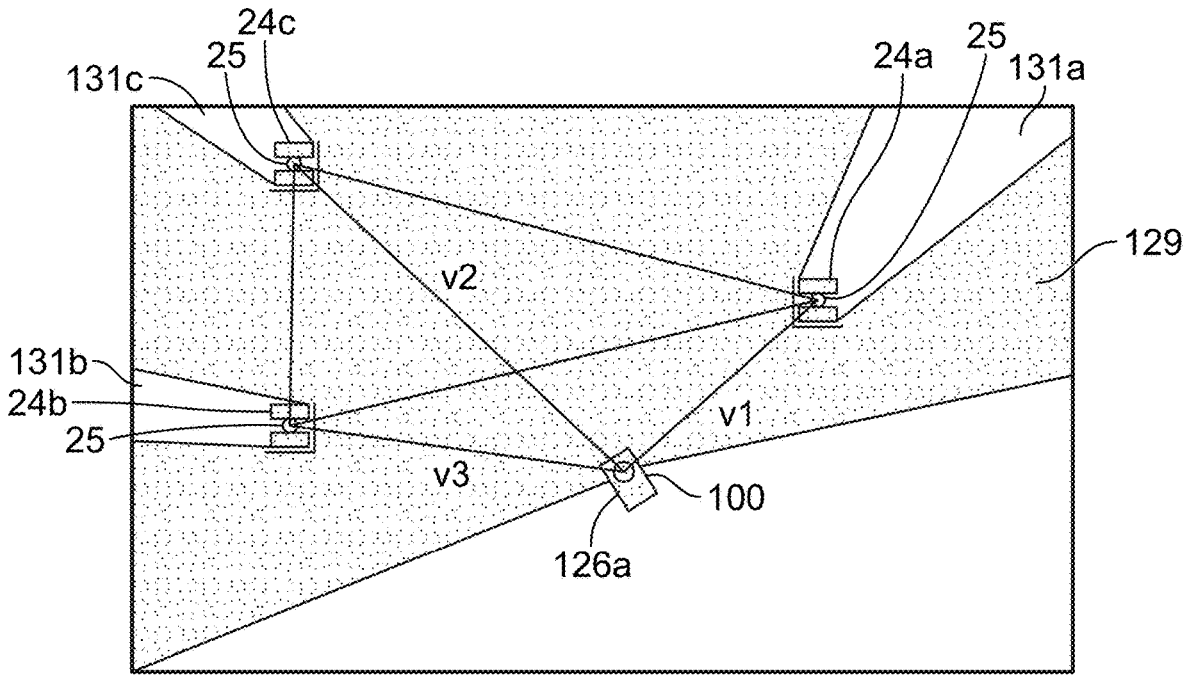
FIG. 6 is a diagrammatic representation of a simplified top (plan) view and associated vector diagram of the mobile inspection platform in relation to the landing gear of the aircraft, according to an embodiment of the present disclosure.

FIG. 6 is a diagrammatic representation of a simplified top plan view and associated vector diagram of the mobile inspection platform 100 in relation to the landing gear 24 of the aircraft 10, according to an embodiment of the present disclosure. In at least one example, the landing gear 24 can be arranged in the form of a triangle, such as (but not limited to) an isosceles triangle. The scanner 126 on the mobile inspection platform 100 may scan laser energy in the horizontal scan plane 132 over a scan area 129. Some of the laser energy in the horizontal scan plane 132 is blocked by the landing gear 24*a*, 24*b*, and 24*c* to form occluded regions 131*a*, 131*b*, and 131*c*, respectively. The occluded regions 131*a-c* represent areas that are occluded or blocked from receiving the laser energy by the landing gear 24*a-c*. The sizes and positions of the occluded regions 131*a-c* change as the mobile inspection platform 100 moves underneath and around the aircraft 10. In an example, the mobile inspection platform 100 may control the scanner 126 to emit laser energy in a 360 degree sweep of the environment, from a stationary position, to acquire the scan data. Alternatively, the mobile inspection platform 100 may travel around the three landing gear 24*a*, 24*b*, and 24*c* while the laser energy is emitted.

As described below in more detail, the localization system 101 (e.g., the control unit 116) may compare detected positions of the landing gear 24*a*, 24*b*, and 24*c* from the scan data with stored reference data regarding the landing gear 24*a*, 24*b*, and 24*c* to determine the respective centers 25 of the landing gears 24*a*, 24*b*, and 24*c*. For example, the memory 118 (shown in FIG. 2) may include landing gear landmark information that includes the geometry of the landing gear 24*a*, 24*b*, and 24*c*. The localization system 101 may determine the locations of the centers 25 based on the scan data at the intersections 136 and the geometry of the landing gear 24*a*, 24*b*, and 24*c* (including relative spacing). Accordingly, the localization system 101, via the scanner 126, is able to determine the centers 25 (e.g., geometric center points) of all three landing gear 24*a*, 24*b*, and 24*c*.

The center 25 of the landing gear 24*a*, 24*b*, and 24*c* may be correlated with the various components of the aircraft 10 to be inspected. For example, a component map of the aircraft 10 may be stored in the central database 204 or the memory 118. The component map may register various components of the aircraft 10 with the three centers 25 of the landing gear 24*a*, 24*b*, and 24*c* and/or with a coordinate system of the aircraft. By knowing the centers 25 and/or a coordinate position of the mobile inspection platform 100 in the coordinate system, the mobile inspection platform 100 can use the component map to navigate to different aircraft components for inspection. During motion of the mobile inspection platform 100 underneath the aircraft 10, the scanner 126 may be used to detect obstacles on the ground. The mobile inspection platform 100 avoids the obstacles detected based on the laser scan. As such, the navigation sub-system 114 is used to navigate the mobile inspection platform 100 and avoid objects underneath and around the aircraft 10. In the same manner, the navigation sub-system 114 is used to navigate and move the inspection robot within areas proximate to and/or remote from the aircraft 10, such as within an apron, which is a defined area of an airport intended to accommodate aircraft (for example, aircraft parking position, aircraft service areas, taxi lanes, roadways, and/or the like).

The following description refers to processes for determining landmark centers from scan data and providing a robust localization process that accommodates (e.g., accounts for) different occlusion states. The landmark centers are the centers of the reference landmarks, such as the centers 25 of the landing gear 24 (shown in FIGS. 5 and 6). The occlusion states refer to the number of reference landmarks that are obstructed during the scan. Some occlusion states refer to situations in which one or more of the landing gear 24 or other reference landmarks are blocked from receiving laser energy during the scan due to the laser energy impinging upon an intervening object, such as another reference landmark. For example, an occluded landmark is a landmark that is located in an occluded region 131 as shown in FIG. 6. Depending on the location of the scanner 126 that acquires the scan data, a given scan may yield zero occluded landmarks (referred to herein as a zero occlusion state), only one occluded landmark (referred to herein as a single occlusion state), two occluded landmarks (referred to herein as a double occlusion state), and/or the like.

Figure 7:
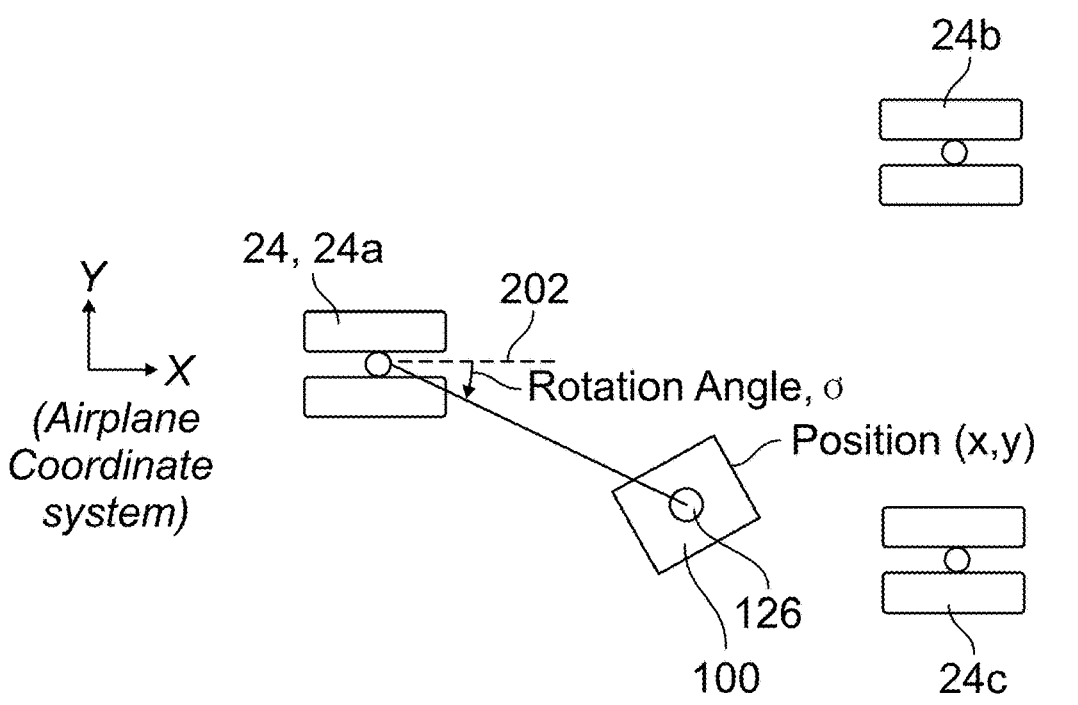
FIG. 7 illustrates a top view of the mobile inspection platform at a first location on the ground relative to the deployed landing gear of the aircraft.

FIG. 7 illustrates the mobile inspection platform 100 at a first location on the ground relative to the deployed landing gear 24 of the aircraft 10. In the first location, the mobile inspection platform 100 has a coordinate position (x, y) within a coordinate system of the aircraft and a rotation angle σ relative to a longitudinal center axis 202 (i.e., the x-axis shown in FIG. 7) of the aircraft 10. The coordinate position and rotation angle of the mobile inspection platform 100 are initially unknown. The localization system 101 may perform the operations described below to determine the coordinate position and rotation angle of the mobile inspection platform 100 at the first location relative to the aircraft 10. The determined first location is used for navigating the mobile inspection platform 100 in the environment, such as to perform one or more inspection tasks.

Figure 8:
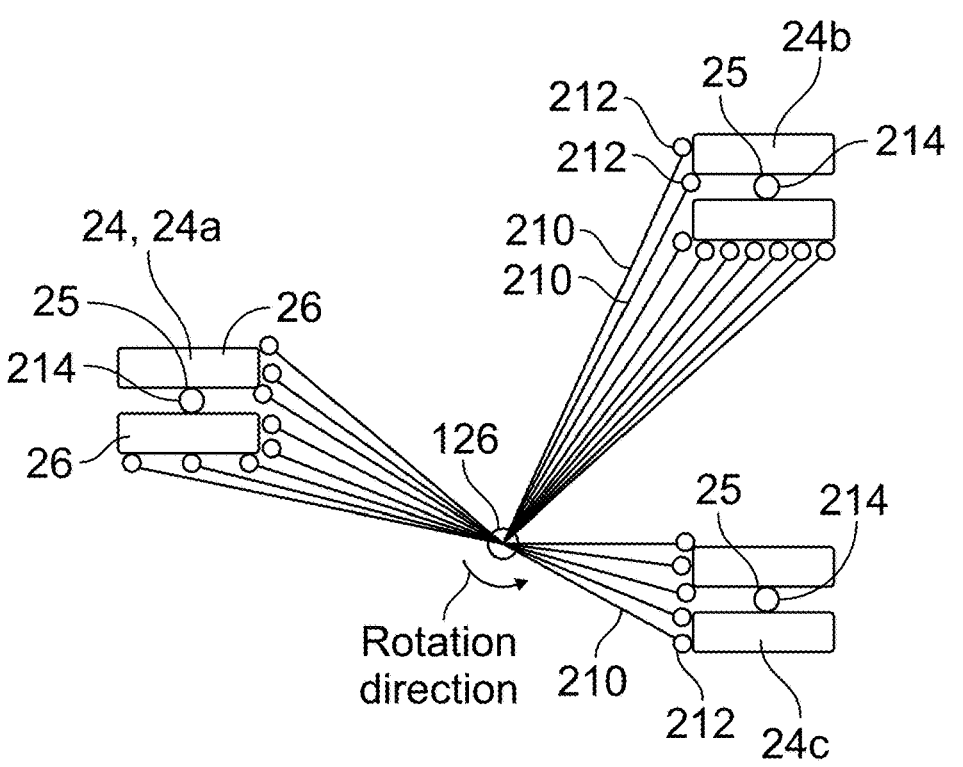
FIG. 8 illustrates a top view of scan lines emitted from a scanner of the mobile inspection platform intersecting the landing gear during a scan according to an embodiment.

FIG. 8 illustrates scan lines 210 emitted from a scanner 126 of the mobile inspection platform 100 towards the landing gear 24 during a scan according to an embodiment. The body of the mobile inspection platform 100 is not shown in FIG. 8. The scanner 126 may perform a sweep during the scan in which the scanner 126 rotates 360 degrees. The scan lines 210 may represent laser beams. The scan lines 210 shown in FIG. 8 may represent a subset of the total scan lines of the scan. The illustrated scan lines 210 in the subset are the scan lines 210 that impinge upon the landing gear 24 at different discrete scan points 212. The scan points 212 may have an equal arclength separation attributable to a controlled sweep of the scanner 126 with a constant rotation rate and laser emission rate. The scanner 126 may be a distance-measuring range sensor that is able to measure distances of the scan lines 210 from the scanner 126 to the scan points 212. For example, the scanner 126 may be a LIDAR sensor. In an alternative embodiment, the scanner 126 may include one or more depth cameras. For example, three depth cameras that are arranged to face 120 degrees apart may be mounted on the mobile inspection platform 100. The fields of view of the cameras may partially overlap to provide 360 degree coverage. The one or more processors may process the image data generated by the depth cameras from the left to the right for clockwise scanning, and from the right to the left for counterclockwise scanning.

As shown in FIG. 8, the centers 25 of the landing gear 24 may be defined within landing gear supports 214 of the landing gear 24. Each landing gear support 214 is disposed between two corresponding wheels 26 of the respective landing gear 24. The scan points 212 in FIG. 8 are disposed along the wheels 26, rather than the landing gear supports 214. Reference to the wheels 26 herein collectively refers to both the inner wheel structure and the tire, unless otherwise stated. Because the laser beams do not impinge upon the landing gear supports 214, the localization system 101 may not be able to determine the centers 25 of the landing gear 24 by direct measurement. In an embodiment, distances of the surface scan points 212 and angles of the scan lines 210 that impinge on the wheels 26 are measured by the localization system 101. The localization system 101 then determines the positions of the centers 25 based on those distances and angles, as described herein.

With additional reference to FIG. 7, the localization system 101 may use known the landmark reference data stored in the memory 118 for determining the positions of the centers 25. Optionally, after determining the positions of the centers 25, the localization system 101 may use the landmark reference data with the center positions to determine the location of the mobile inspection platform 100 with respect to a reference location. The reference location may represent an origin of the aircraft coordinate system. Optionally, the reference location may be the center 25 of the front (e.g., nose) landing gear 24a.

Figure 9:
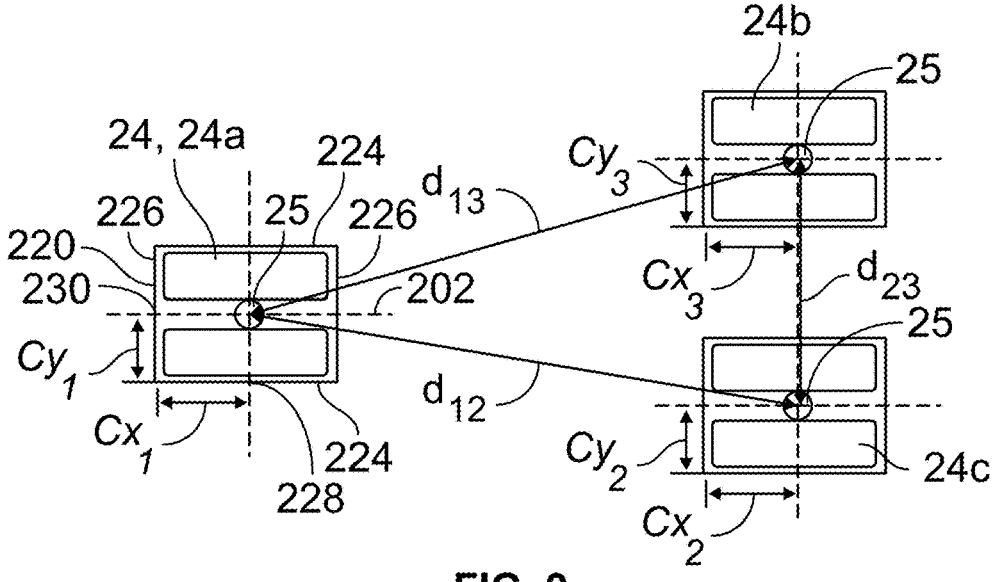
FIG. 9 is a top (plan) view of the landing gear of the aircraft according to an embodiment.

FIG. 9 is a plan (top) view of the landing gear 24a-c of the aircraft 10 according to an embodiment. The landmark reference data may include individual landing gear dimensions, arrangement of the landing gear, spacing between the landing gear, and/or the like. For example, the landing gear dimensions may refer to dimensions of a bounding box 220 that surrounds each landing gear 24. The arrangement of the landing gear may refer to the number and relative positioning of the landing gear 24. In the illustrated example, the aircraft 10 has three landing gear 24a-c arranged in a triangle. The triangle may be an isosceles triangle. The spacing between the landing gear 24 may include a length, parallel to the center longitudinal axis 202, from the center 25 of the front (e.g., nose) landing gear 24a to the center 25 of either of the aft landing gear 24b, 24c. The spacing may include a first (e.g., lateral) center-to-center distance $d_{23}$, perpendicular to the center longitudinal axis 202, from the center 25 of the first aft landing gear 24b to the center 25 of the second aft landing gear 24c. Optionally, the spacing may include a second center-to-center distance $d_{13}$ from the center 25 of the front landing gear 24a to the center 25 of the first aft landing gear 24b, and a third center-to-center distance $d_{12}$ from the center 25 of the front landing gear 24a to the center 25 of the second aft landing gear 24c. The second and third center-to-center distances $d_{13}$ and $d_{12}$ may be equidistant when the landing gear 24 are arranged as an isosceles triangle.

The landmark reference data may include offset values from perimeter edges of the landing gear 24 to respective centers 25 of the landing gear 24. The offset values may define the distance from the center 25 to a mid-point of a corresponding perimeter edge. For example, the front landing gear 24a has a rectangular perimeter with two longer sides 224 and two shorter sides 226. The offset value from a mid-point 228 of the longer sides 224 to the center 25 is $Cy_1$ in FIG. 9. The offset value from a mid-point 230 of the shorter sides 226 to the center 25 is $Cx_1$. The offset values $Cx_1$, $Cy_1$, $Cx_2$, $Cy_2$, $Cx_3$, $Cy_3$ for each of the landing gear 24 may be stored as part of the landmark reference data. The offset values, center-to-center distances, and/or other data may be determined by computer-aided design (CAD) models, engineering drawings, or directly measured distances.

Figure 10:
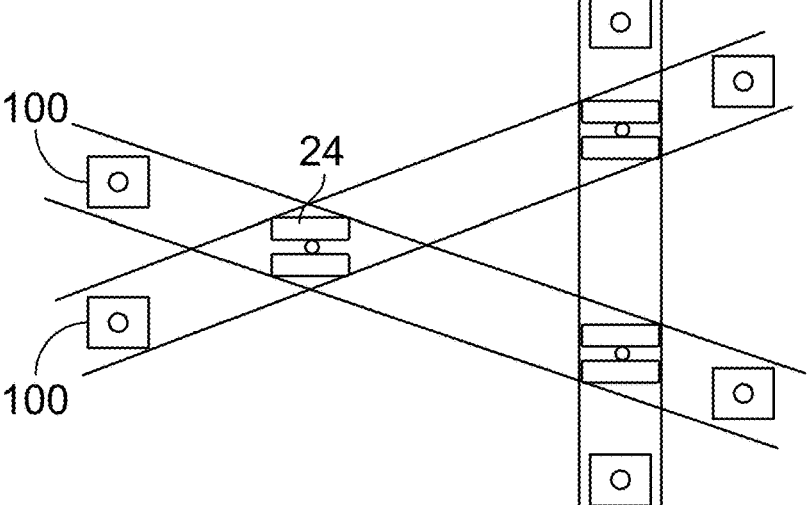
FIG. 10 is a top view diagrammatic illustration showing six positions of the mobile inspection platform having a single occlusion state.
Figure 11:
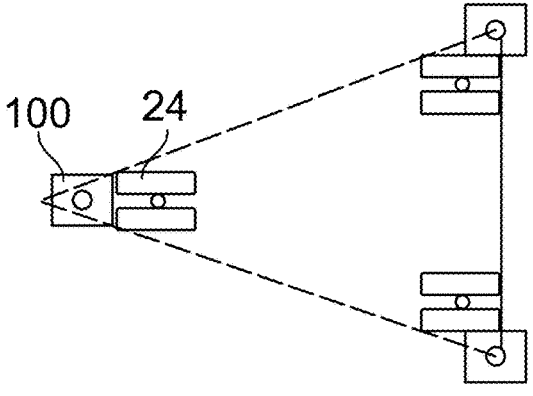
FIG. 11 is a top view diagrammatic illustration showing three positions of the mobile inspection platform having a double occlusion state.

The position of the mobile inspection platform 100 in FIGS. 7 and 8 represents a zero occlusion state. As shown in FIG. 8, the scan lines 210 impinge on each of the landing gear 24a-c without any landing gear or other object obstructing another landing gear. As described in relation to FIG. 6, there are multiple potential locations of the mobile inspection platform 100 in which one landmark (e.g., landing gear 24) occludes at least one other landmark. FIG. 10 is a diagrammatic illustration showing six positions of the mobile inspection platform 100 having a single occlusion state. In the single occlusion state, one landmark obstructs the scanner's 126 "view" of one other landmark. As such, the scanner 126 may measure scan points 212 at only two of the three landing gear 24. FIG. 11 is a diagrammatic illustration showing three positions of the mobile inspection platform 100 having a double occlusion state. In the double occlusion state, one landmark obstructs the scanner's 126 view of two other landmarks. As such, the scanner 126 may measure scan points 212 at only one of the three landing gear 24. The localization system 101 described herein can accommodate each of the zero, single, and double occlusion states. For example, the localization system 101 may determine the occlusion state, and then use different sets of functions (e.g., equations) depending on the occlusion state that is determined.

Figure 12:
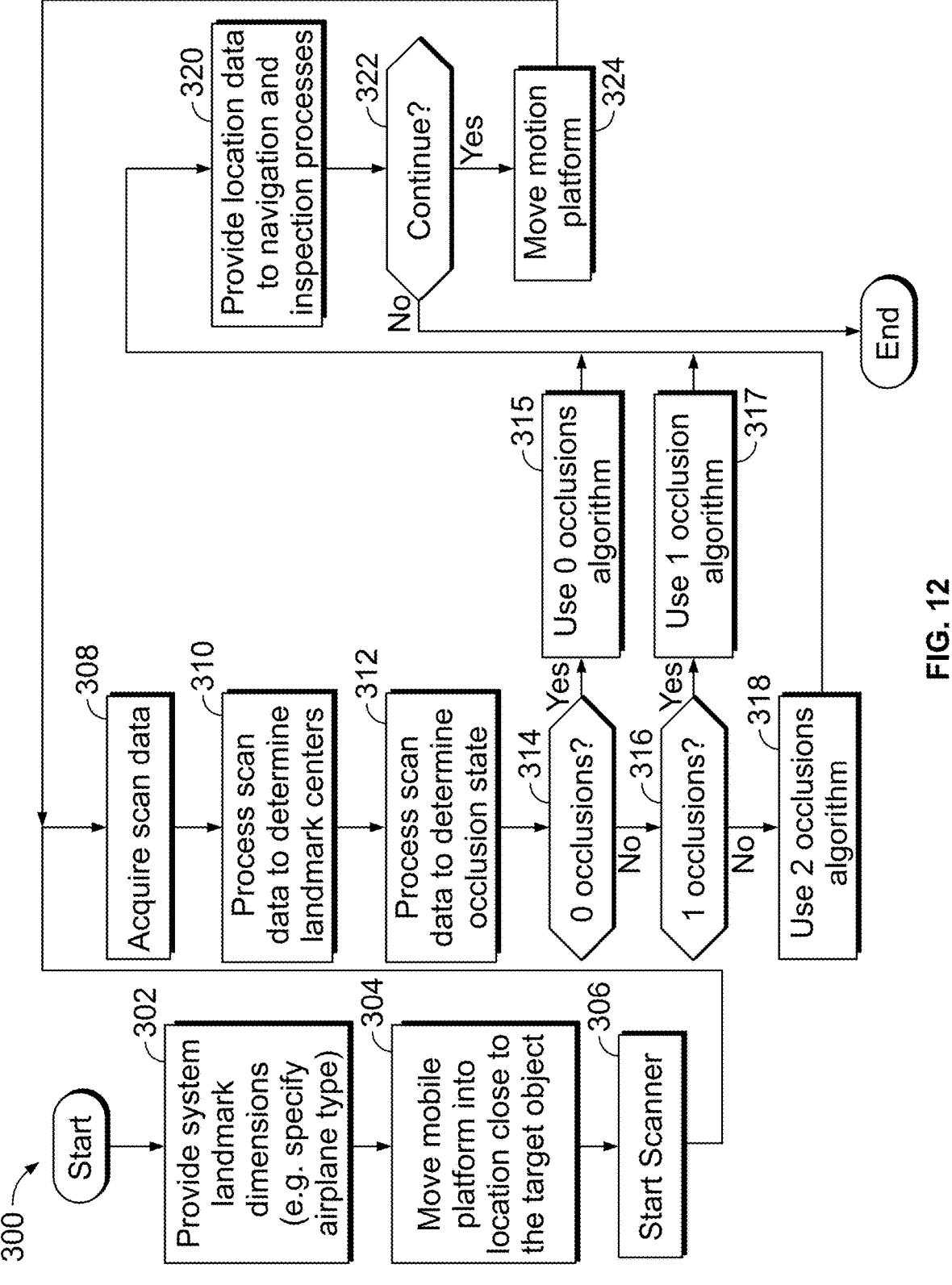
FIG. 12 illustrates a flow chart of a localization method, according to an example of the present disclosure.

FIG. 12 illustrates a flow chart 300 of a localization method, according to an example of the present disclosure. The localization method 300 may be performed to inspect an aircraft prior to a flight or after a flight of the aircraft. For example, a mobile inspection platform may be tasked with inspecting various target components of the aircraft. The localization method 300 may be performed by the localization system 101 shown in FIG. 2, such as the control unit 116. The method 300 is described herein as being performed by one or more processors. The one or more processors may be part of the control unit 116 of the localization system 101. The method 300 may determine the location (e.g., position and orientation) of the mobile inspection platform relative to a surrounding environment, such as relative to an aircraft. The mobile inspection platform may be the mobile inspection platform 100. Optionally, the method 300 may include additional steps than shown in FIG. 12, fewer steps than shown in FIG. 12, and/or different steps than shown in FIG. 12.

At step 302, system landmark dimensions are provided. For example, the one or more processors may obtain the landmark reference data from the memory 118 and/or the central database 204. The one or more processors may obtain relevant landmark reference data by determining the specific type of aircraft to be inspected and obtaining the landmark reference data specific to that type of aircraft. At step 304, the one or more processors move the mobile inspection platform 100 to a location that is proximate to a target object (e.g., aircraft). The one or more processors may control the propulsion sub-system 104 to move the mobile inspection platform 100.

At step 306, once the mobile inspection platform 100 is in the general vicinity of the target object, the method includes starting the scanner 126 of the mobile inspection platform 100 to perform a scan of the surrounding environment. The general vicinity may refer to a range that allows the scanner 126 to perform the scan which acquires data including the target object. The range may be 10 meters (m), 20 m, or the like. The scanner 126 may be a laser scanner, such as a LIDAR sensor. In some embodiments, the mobile inspection platform 100 may be stationary when the scanner 126 performs the scan. In other embodiments, the mobile inspection platform 100 may be moving at a known velocity when the scanner 126 performs the scan. The scanner 126 may perform a full 360-degree sweep (e.g., a full rotation). The scan rotation direction may be clockwise or counterclockwise. During the scan or soon afterward, the method at step 308 includes obtaining scan data acquired by the scanner 126 during the scan. The scan data may include the distances from the scanner 126 to the scan points 212 and angles between the scan lines 210 as shown in FIG. 8. The scan data may also include the rotation direction of the scan. Each scan point 212 may include an angle relative to a reference direction and a distance from the scanner 126 to the point of impingement on an object. The scan data may be stored, at least temporarily, in the memory 118.

At step 310, the one or more processors process the scan data to determine landmark centers (e.g., the centers of reference landmarks in the surrounding environment). In the illustrated example, the landmark centers represent the centers 25 of the landing gear 24*a-c*. The mechanism of processing the scan data to determine the landmark centers is described in more detail with reference to the flow chart 400 in FIG. 13.

At step 312, the scan data is processed to determine the occlusion state. The occlusion state is determined in order to select appropriate localization functions (e.g., algorithms, equations, etc.) to use for determining the location of the mobile inspection platform 100 relative to the aircraft 10. For example, the method includes using different algorithms based on the number of occlusions. The determination of the occlusion state (e.g., the number of occlusions) is described in more detail herein with reference to FIGS. 13 and 15. The one or more processors may perform steps 310 and 312 in any relative order, or even concurrently.

At step 314, it is determined whether the mobile inspection platform 100 is in a zero occlusion state. If so, then flow of the method proceeds to step 315 and a zero-occlusion algorithm is selected for determining the location of the mobile inspection platform 100 relative to the aircraft 10 (e.g., the aircraft coordinate system). If the mobile inspection platform 100 is determined to not be in the zero occlusion state at step 314, then flow continues to step 316. At step 316, it is determined whether the mobile inspection platform 100 is in a single occlusion state. If so, then flow of the method proceeds to step 317 and a single-occlusion algorithm is selected for determining the location of the mobile inspection platform 100 relative to the aircraft 10 (e.g., the aircraft coordinate system). If the mobile inspection platform 100 is determined to not be in the single occlusion state at step 316, then flow continues to step 318. At step 318, a double-occlusion algorithm is selected for determining the location of the mobile inspection platform 100 relative to the aircraft 10 (e.g., the aircraft coordinate system).

The appropriate algorithm at either step 315, 317, or 318 outputs a location of the mobile inspection platform 100 relative to the aircraft 10. The location may include the position (x, y) and orientation (a) of the mobile inspection platform 100 relative to a reference position and angle. The location may be output as location data. At step 320, the location data is provided to navigation and inspection processes onboard the mobile inspection platform 100. Based on the location data, the one or more processors determine, at step 322, whether to continue moving the mobile inspection platform 100 within the surrounding environment. For example, the one or more processors may compare the current location of the mobile inspection platform 100 to a designated location or proximity range for performing an inspection task. If the mobile inspection platform 100 is at the designated location or within the proximity range of an aircraft component on which to perform the inspection task, then the one or more processors determine that continued movement is not necessary, so the flow of the method 300 ends. The one or more processors perform the inspection task. If, on the other hand, the one or more processors determine that continued movement of the mobile inspection platform 100 is necessary, flow continues to step 324.

At step 324, the one or more processors control movement of the mobile inspection platform 100. For example, if the one or more processors determine, based on the current location of the mobile inspection platform 100, that the mobile inspection platform 100 is not at the designated location or is outside of the proximity range of the aircraft component, then the one or more processors determine that continued movement is necessary to get the mobile inspection platform 100 in range for performing the inspection task. The one or more processors may control the propulsion sub-system 104 to propel the mobile inspection platform 100 closer towards the component on which to perform the inspection task. Either after the mobile inspection platform 100 completes a controlled movement or during the controlled movement, the flow of the method 300 returns to step 308 and additional scan data is acquired by the scanner 126.

FIG. 13 illustrates a flow chart 400 of a method to determine the centers of reference landmarks (e.g., reference centers) according to an embodiment of the present disclosure. The flow chart 400 may represent an expanded algorithm for steps 310 and 312 shown in FIG. 12. For example, the method may start after obtaining scan data acquired by a scanner 126 performing a scan of the surrounding environment. The method of determining the reference centers is performed by one or more processors. The one or more processors may be components of the control unit 116 of the localization system 101. The method may include additional steps, fewer steps, and/or different steps than shown in FIG. 13.

Figure 14:
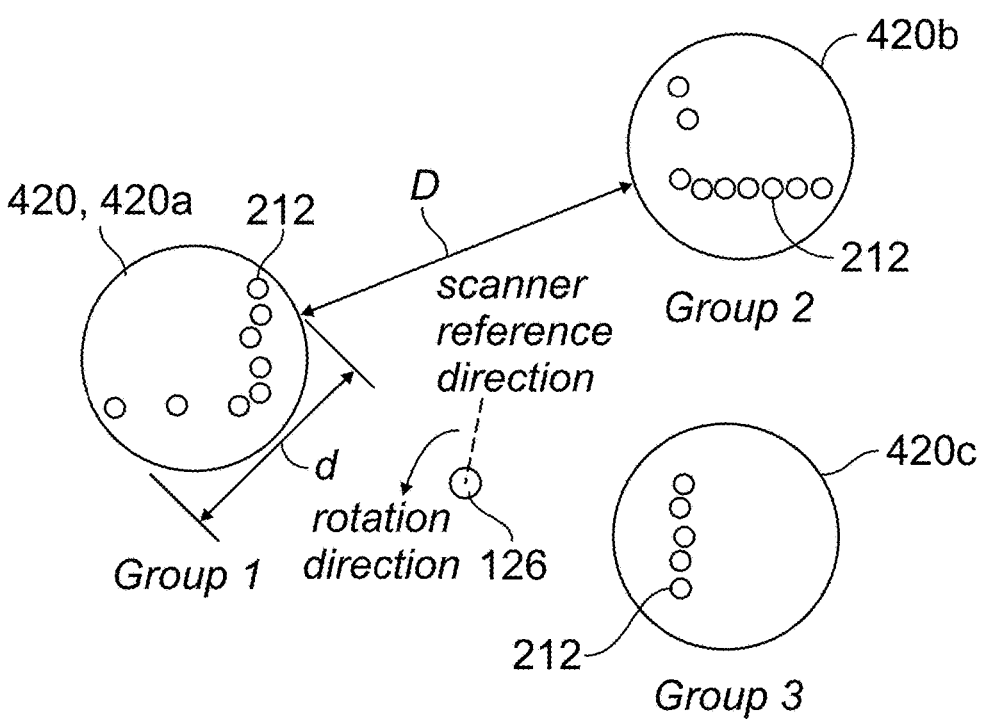
FIG. 14 is a diagram showing three groups of scan points from the scan shown in FIG. 8 according to an embodiment.

At step 402, upon obtaining the scan data, the scan points 212 of the scan data may be grouped or clustered into different groups 420 based on proximity of the scan points 212 to one another. FIG. 14 is a diagram showing three groups (e.g., groupings) 420*a*, 420*b*, 420*c* of scan points 212 from the scan shown in FIG. 8 according to an embodiment. For example, the scan points 212 are grouped such that a maximum distance between points 212 in the same group (d in FIG. 14) is less than the shortest distance between points 212 from different groups (D in FIG. 14). The one or more processors may group the scan points 212 based on a designated threshold distance value, such that points 212 separated by larger than the threshold distance value are classified into different groups 420, and points 212 closer to one another than the threshold distance value are classified into the same group 420. The threshold distance may be greater than d and less than D. In an embodiment, scan data from the scanner 126 may be ordered, such that the scan points 212 in each group 420 may be in series rather than mixed together. An exception may be when the scan data wraps around from 3600 to 0°. In this wrap-around case, groups 420 that are within the same general region (with separation spacing less than d) may be merged. The groups 420 may be numbered in the order of detection by the scanner 126 during the sweep. For example, the groups 420 may be ordered proceeding in the rotation direction with respect to a scanner reference direction. The rotation direction is counterclockwise in the illustrated example. As shown in FIG. 14, the first group 420*a* includes the scan points 212 that impinge upon the front landing gear 24*a*, the second group 420*b* includes the scan points 212 that impinge upon the first aft landing gear 24*b*, and the third ground 420*c* includes the scan points 212 that impinge upon the second aft landing gear 24*c* from the first position of the scanner 126.

At step 404, the scan points 212 in each group 420 are converted into one or more line segments 430 associated with landmark edges. For example, the landmark edges may be the perimeter sides 224, 226 of the landing gear 24 shown in FIG. 9. The one or more processors may determine which scan points 212 in each group 420 are part of the same line segment based on the alignment of the scan points 212 in series. For example, the one or more processors may determine a deviation of a third scan point from a line defined between two scan points adjacent or proximate to the third scan point. In an embodiment, the one or more processors may using a computation involving the angle between two lines, where each line is defined by two respective points. One such computation involves the use of a dot product:

$$a \cdot b = |a||b|\cos(\theta)$$

$$\theta = \mathrm{acos}[(a \cdot b)/(|a||b|)]$$

Figure 15:
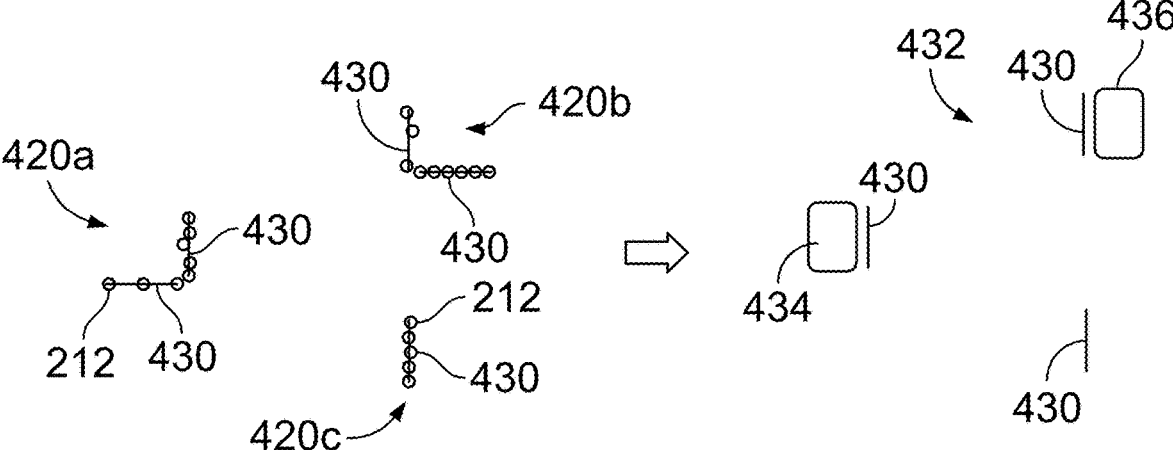
FIG. 15 illustrates three groups of scan points converted into five line segments.

Each pair of points 212 forms a line. A first line formed by a first pair of points is compared to a second line formed by a second pair to determine if the second line is within a small threshold of the first line. If so, the first and second pairs of points are joined in a common subset of points representing an individual line segment. Once the points in a subset are determined, the scan points at the ends of the same subset define the endpoints of that line segment 430. FIG. 15 illustrates the three groups 420a-c of scan points 212 converted into five line segments 430.

At step 406, parallel line segments among the different groups 420 are determined. The method may include analyzing the line segments 430 determined at step 404 to find line segments 430 that are parallel among different groups 420. The one or more processors may use the "angle between two lines" process described above to determine parallel line segments. Optionally, line segments 430 may be determined to be parallel if a first angle of a first line segment, relative to the reference direction, is within a designated threshold margin (e.g., +/−2 degrees, 3, degrees, 4 degrees, 5 degrees, or the like) of a second angle of a second line segment relative to the reference direction. Optionally, the line segments 430 may be determined to be parallel if an angle defined between the first line segment and the second line segment is within the designated threshold margin of zero degrees. Two line segments that are outside of the designated threshold margin are determined to not be parallel. The one or more processors may count the number of line segments that are parallel to each other. There may be multiple sets of parallel line segments. The one or more processors may search for the set that has the most parallel line segments. The one or more processors may look for sets of three parallel lines. In FIG. 15, the one or more processors determine that there are three parallel line segments 430 in a first set 432, and only that first set 432 of three parallel line segments 430 is shown on the right side of the diagram.

In an example, line segments 430 that are identified in step 404 but that are not part of the set 432 of three parallel line segments 430 (e.g., the parallel line set 432) may be used by the one or more processors to indicate potential center locations on a specific side of the parallel lines 430. For example, the first group 420a of scan points 212 has a line segment 430 that extends from the line segment 430 in the parallel line set 432 towards the left. Based on the L-shape of the two line segments 430 in the first group 420a, the one or more processors may determine that the potential center location in the first group 420a is to the left of the line segment 430 in the parallel line set 432. The box 434 represents an area that may include the center of the front landing gear 24a. Similarly, in the second group 420b, the non-parallel line segment 430 extends towards the right from the intersection with the line segment 430 in the parallel line set 432, which indicates that the potential center location in the second group 420b is to the right of the line segment 430 in the parallel line set 432. The box 436 represents an area that may include the center of the first aft landing gear 24b. There is no second line segment extending from the line segment 430 in the third group 420c, so no box is shown on either side of that line segment 430 on the right side of FIG. 15.

At step 408, an occlusion state is determined based at least in part on the number of parallel line segments 430 between the different groups 420 of scan points 212. For example, at least one set of three parallel line segments 430 from the three different groups 420 may indicate the zero occlusion state. In the illustrated embodiment, the one or more processors may determine that the mobile inspection platform 100 is in the zero occlusion state based on the detected set 432 of three parallel line segments 430 shown in FIG. 15. In another embodiment in which the one or more processors only detect at most two parallel line segments 430 from different groups 420, then the one or more processors may determine that the mobile inspection platform 100 is in the single occlusion state. In yet another embodiment, if no parallel line segments 430 are detected between the different groups 420, the one or more processors may determine that the mobile inspection platform 100 is in the double occlusion state. The occlusion state may be used by the one or more processors to select patterns for matching and/or to select localization algorithms.

Figure 16:
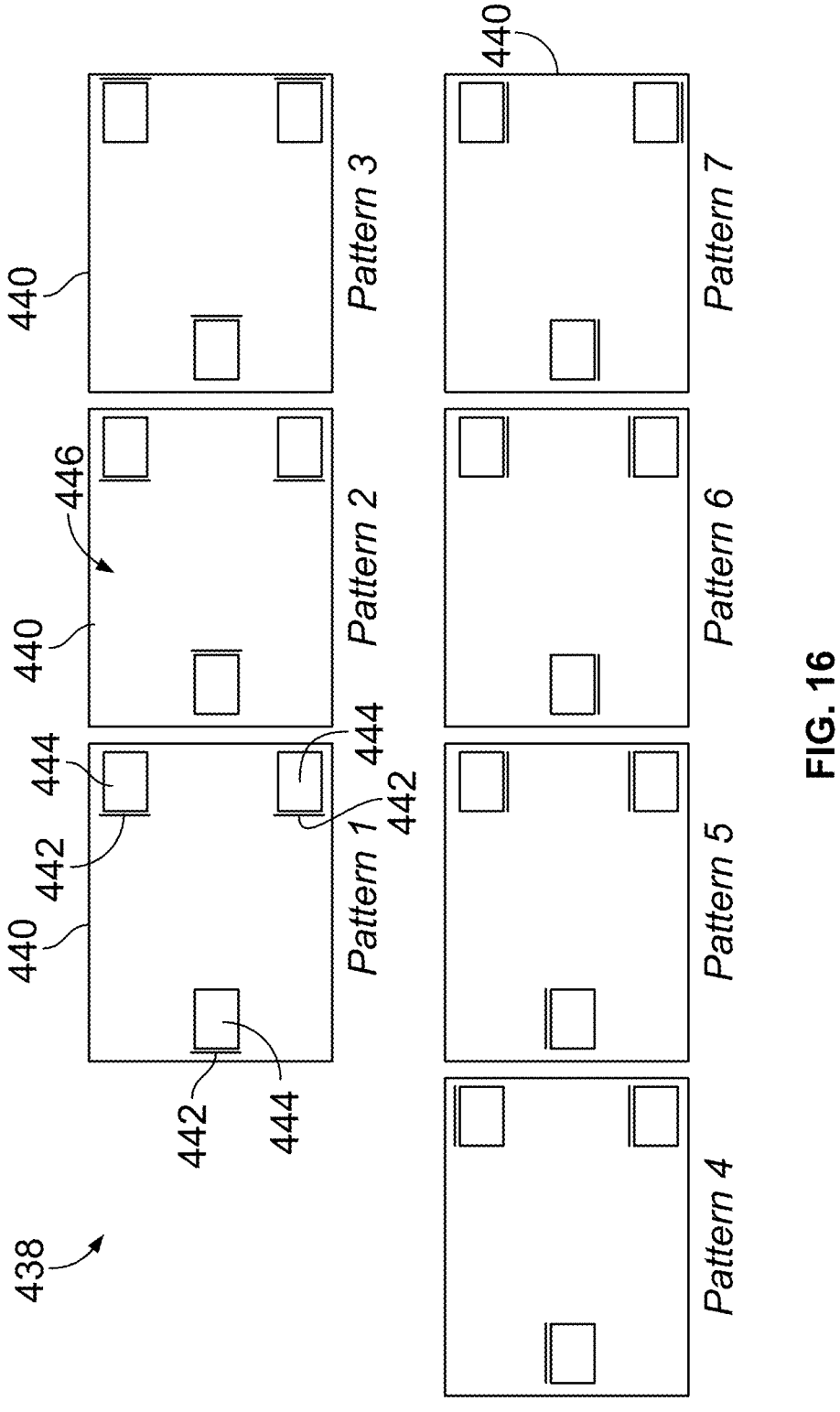
FIG. 16 shows a first class of multiple patterns associated with the zero occlusion state according to an embodiment.

At step 410, the parallel line segments 430 are matched to designated patterns associated with different regions (e.g., areas) in the surrounding environment. For example, each pattern may correspond to a different region in which the mobile inspection platform 100 (e.g., the scanner 126 thereof) may be located. The surrounding environment may be the area under and surrounding the aircraft 10, as shown in FIGS. 1, 4, and 5. FIG. 16 shows a first class 438 of multiple patterns 440. The patterns 440 may be stored in the memory 118 and/or the central database 204. The patterns 440 may be arranged into different classes or categories based on the occlusion state. In the illustrated embodiment, the one or more processors may access the class of patterns 440 that are associated with the zero occlusion state. FIG. 16 shows seven different patterns 440 in the first class 438 associated with the zero occlusion state. Each pattern 440 includes the locations of three parallel lines 442 and shaded boxes 444 indicating the footprints of the landmarks (e.g., the landing gear 24).

The one or more processors may compare the set 432 of parallel line segments 430 shown on the right side of FIG. 15, as measured via the scan, to the various different patterns 440 to determine which pattern 440 best matches the measured set 432. For example, the one or more processors may determine which of the multiple patterns 440 in the class 438 matches the measured set 432 of parallel line segments 430 better than all of the other patterns 440 in the class 438. The selected pattern 430 may then be used to set the direction of the landmark center offset. In the illustrated embodiment, the one or more processors determine that Pattern 2 is the best-matching pattern 446 to the arrangement in FIG. 15. Based on determining that Pattern 2 is the best-matching pattern 446, the one or more processors may determine that the mobile inspection platform 100 is disposed within the region of the surrounding environment associated with Pattern 2.

Figure 17:
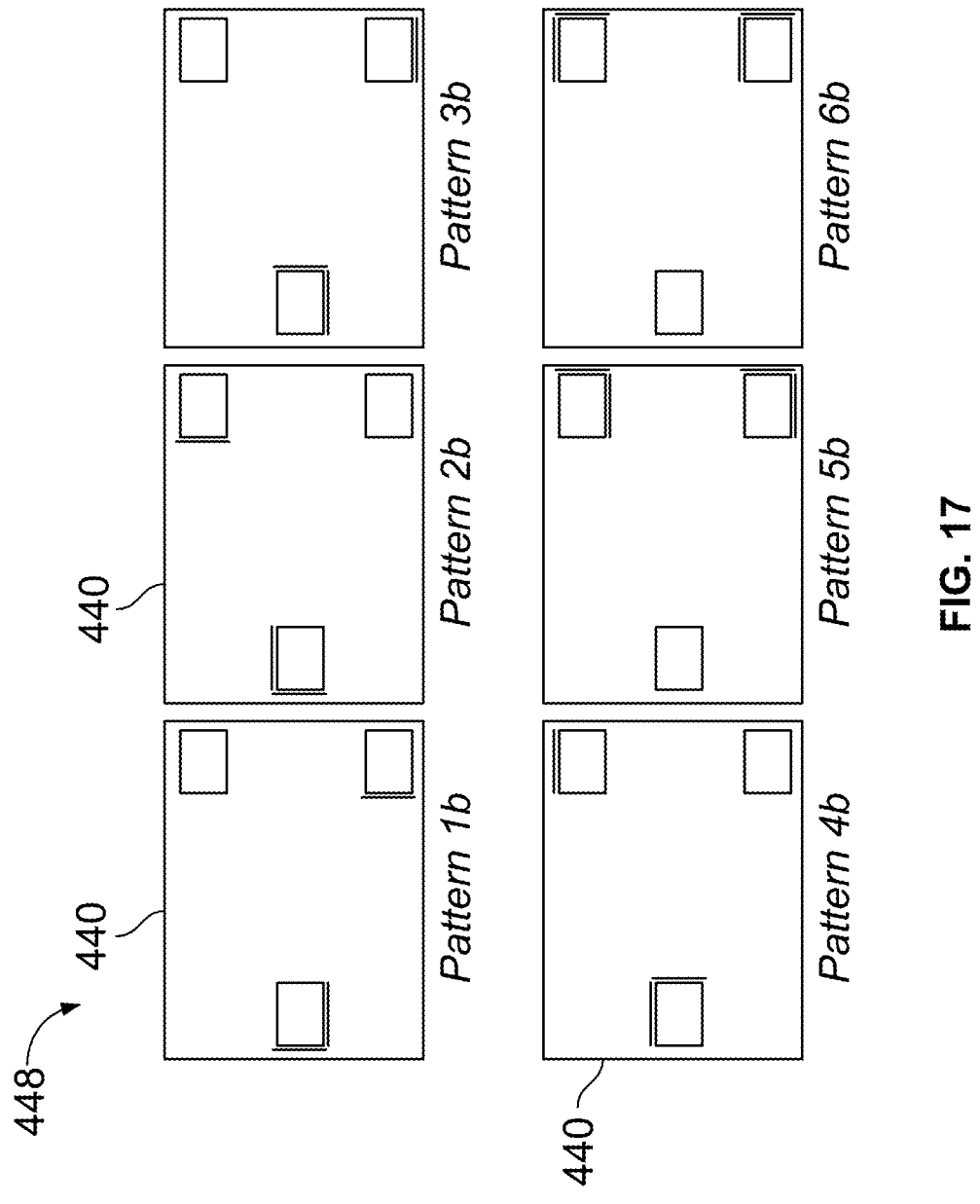
FIG. 17 shows a second class of multiple patterns associated with the single occlusion state according to an embodiment.

FIG. 17 shows a second class 448 of multiple patterns 440 according to an embodiment. The second class 448 may refer to the single occlusion state. There may be six example patterns 440 in the second class 448. For example, in situations in which one landmark (e.g., landing gear 24) is occluded, the mobile inspection platform 100 may be in one of six different regions of the environment. The mobile inspection platform 100 may be in one of the six areas shown in FIG. 10. The one or more processors may determine that the second class 448 of patterns 440 is appropriate upon determining that the mobile inspection platform 100 is in the single occlusion state. For example, the one or more processors may detect that there are no more than two parallel line segments 430 between different groups 420 in each set of parallel line segments 430. The double occlusion state may be associated with a third class of patterns 440. The third class may include three different patterns 400 corresponding to the three different locations of the mobile inspection platform 100 shown in FIG. 11.

At step 412, offsets are determined based on the pattern of the designated patterns that best matches the parallel line segments. The best-matching pattern 446 identifies the footprints and edge lines of the reference landmarks as the shaded boxes 444. The reference landmarks are the landing gear 24 in an example application. FIG. 18 illustrates shaded boxes 444 of the reference landmarks with vector directions 450 for all edge lines. The one or more processors may calculate an offset direction vector. The offset direction vector may be calculated from a cross-product of a directional edge line vector (v) and a Z-axis unit vector (z), according to the following:

$$[vx, vy, vz] x [0,0,1] = [nx, ny, nz]$$

At step 414, the offsets that are determined are applied to mid-points of the line segments 430 in the groups 420 to determine the centers of the reference landmarks (e.g., the reference centers). The centers may be determined by calculating a center vector. For example, the one or more processors may calculate the center vector by multiplying a known offset distance value for the landmark by a normalized offset direction vector ($\|n\|$). The known offset distance value may be the offset distance scalar C, used in the following:

$$\text{Center vector} = C * \|nx, ny, nz\|$$

The known offset value may be a corresponding one of the offset values $Cx_1$, $Cy_1$, $Cx_2$, $Cy_2$, $Cx_3$, $Cy_3$ for the landing gear 24 stored as part of the landmark reference data. FIG. 18, in the lower picture, shows one of the directional edge line vectors 450 and one of the center vectors 454 extending from the edge line vector 450 to the center 25 of the landmark. The centers 25 may be determined as (x, y) point pairs defined in the local coordinate system of the surrounding environment and/or target object. For example, the centers 25 may be provided as (x, y) point pairs in an aircraft coordinate system.

After step 414, the method may proceed with the localization process. For example, the method may proceed to step 314 of the method 300 in FIG. 12. The occlusion state can be used to determine which localization algorithms are appropriate. The determined landmark centers are then input into the appropriate localization algorithm to determine the location of the mobile inspection platform 100 relative to the aircraft 10. The selected localization algorithm may receive the center locations as the (x, y) point pairs.

FIG. 19 is a diagram 500 for a localization process with three visible landmarks and zero occlusions (e.g., the zero occlusion state). The localization process is performed by one or more processors of the localization system 101, such as the control unit 116. The diagram 500 includes a plural variables representing different properties. For example, the variables x, y, and o are the unknown variables representing the overall position and orientation of the mobile inspection platform 100 (or scanner 126 thereof) in the target coordinate system. These are the variables that the one or more processors are going to solve. The variables L12, L13, L23, a, and R may be known (e.g., pre-determined) as part of the reference landmark data. The variables L12, L13, L23 may represent lengths with respect to the target object frame, referred to herein as the center-to-center distances between the landing gear 24. The variables P1, P2, P3 may represent landmark points with respect to the target object frame, referred to herein as the landmark centers. The variables L12', L13', L23', P1', P2', P3' represent the center-to-center distances and the landmark centers with respect to the sensor frame of reference. The variables d1, d2, d3, ϕ11, ϕ12, ϕ13 may be measured variables via the scan data. The derivation may include the following equations:

| | | |
|---|---|---|
| $x1 = d1*\cos(\phi1)$ | $x2 = d2*\cos(\phi2)$ | $x3 = d3*\cos(\phi3)$ |
| $y1 = d1*\sin(\phi1)$ | $y2 = d2*\sin(\phi2)$ | $y3 = d3*\sin(\phi3)$ |

$$L12' = \sqrt{(x2-x1)^2 + (y2-y1)^2}$$
$$L23' = \sqrt{(x3-x2)^2 + (y3-y2)^2}$$
$$L13' = \sqrt{(x3-x1)^2 + (y3-y1)^2}$$

The one or more processors may determine the point order. In an example, the front landing gear 24a (e.g., nose gear) may be the point opposite the shortest length (found by comparing lengths of L12', L23', and L13'), which will be associated with length L23 from the landing gear dimensions. The one or more processors may then perform order mapping using counterclockwise reference from sensor heading direction. In an example, P1' is the point opposite the shortest length (L23'), and P1'→P1, P2'→P2, P3'→P3. Variables with an apostrophe mark represent the landmark in the order discovered by the scanner for counterclockwise rotation (defined with respect to the sensor reference frame), and the variables without the apostrophe are the order as defined with respect to the target object reference frame. The one or more processors may determine the angle and position (e.g., the location) of the mobile inspection platform 100 according to the following:

$$A = a\cos[(d1^2 + L12'^2 - d3^2)/(2*d1*L13')]$$

$$\theta1 = A + \alpha/2$$

$$\cos(\theta1) = -\cos(\phi1 + \sigma)$$

$$\sin(61) = -\sin(\phi1 + a)$$

which, when rewritten to solve for the unknown variables, yields the following:

$$\sigma = a\tan 2[-\cos(\theta1), -\sin(\theta1)] - \phi1$$

$$x = d1*\cos(A + \alpha/2)$$

$$y = d1*\sin(A + \alpha/2)$$

Figure 20:
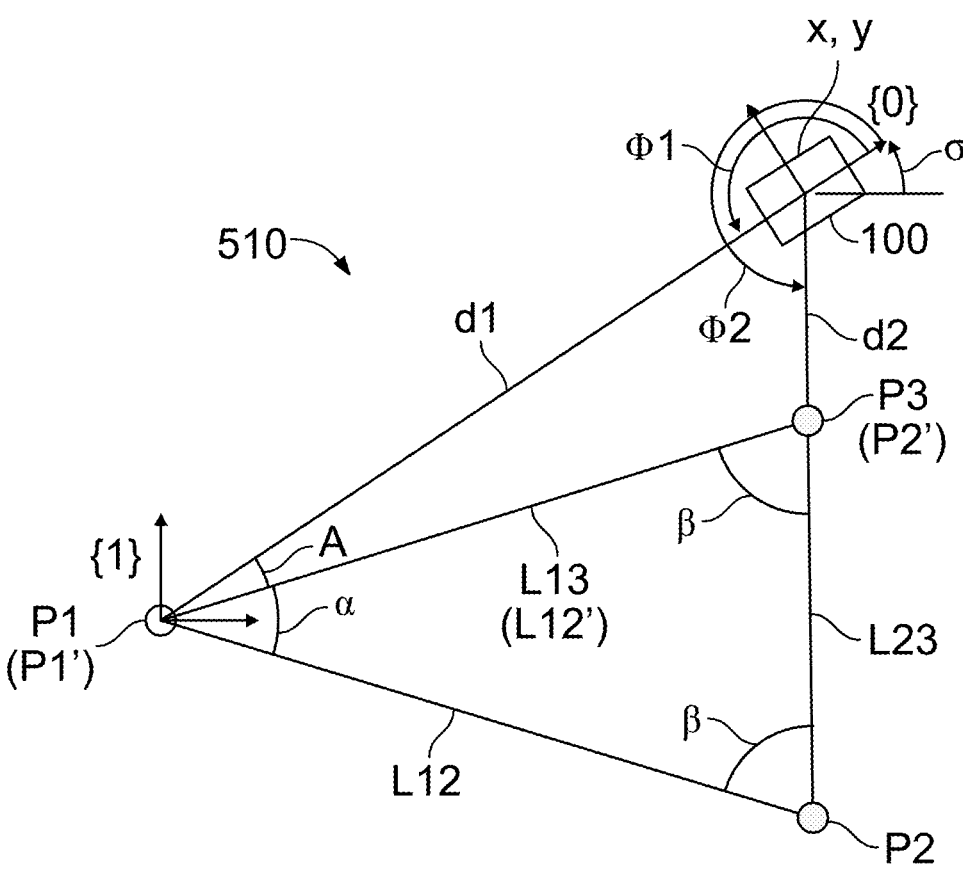
FIG. 20 is a diagram for a localization process with two visible landmarks and one occlusion.

FIG. 20 is a diagram 510 for a localization process with two visible landmarks and one occlusion (e.g., the single occlusion state). The derivation for the single occlusion state may use the same known variables, unknown variables, and measured variables from the scan data, as described above with respect to the zero occlusion state. The region at which the sensor (e.g., scanner) is located may be determined by the one or more processors according to the following:

if L12' ≠ L23     (L12' is not the shortest side)
  if d2 > d1     (sensor on left side)
    $\sigma = 270° - \phi1$
  else if d1 > d2     (sensor on right side)
    $\sigma = 90° - \phi2$
else if L12' = L23     (L12' is the shortest side)
  if d1 > d2     (sensor on left side)
    $\sigma = 360° - \phi2 - \alpha/2$
  else if d2 > d1     (sensor on right side)
    $\sigma = 180° - \phi1 - \alpha/2$ The one or more processors may determine the angle and position (e.g., the location) of the mobile inspection platform 100 according to the following:

$$A=acos[(d1^2+L12'^2-d2^2)/(2*d1*L12')]$$

$$x=d1*cos(A+\alpha/2)$$

$$y=d1*sin(A+\alpha/2)$$

FIG. 21 is a diagram 520 for a localization process with one visible landmark and two occlusions (e.g., the double occlusion state). This double occlusion situation is different from the other occlusion conditions because there may be insufficient data available to use the landmark location geometry to directly solve for the position and orientation of the mobile inspection platform 100. For the double occlusion state, the one or more processors may use a dead reckoning method that involves changes from the last known location. If a previous location of the mobile inspection platform 100 (e.g., the sensor thereof) was known before the double occlusion state occurred, the one or more processors may use the difference in position of the edge lines of the landmarks from the prior location to determine the new location. The new position may represent the old position plus the change in position (e.g., New Position=Old Position+ΔPosition). The new angle may represent the old angle plus the change in angle (e.g., New Angle=Old Angle+ΔAngle). For example, the one or more processors may determine the difference in position of one of the line segments 430 of the scan data shown in FIG. 15, relative to a previous location of the mobile inspection platform 100, and determine the current location of the mobile inspection platform 100 based on the previous location and the change in position.

Figure 22:
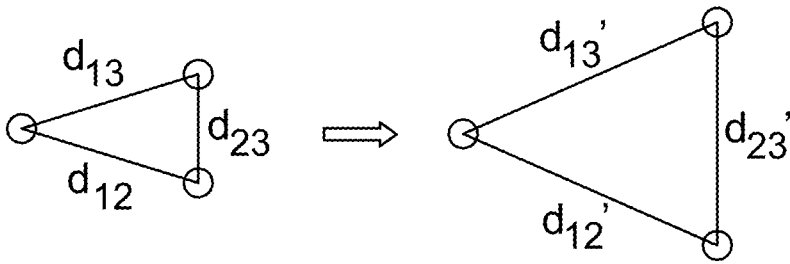
FIG. 22 illustrates a situation in which the landmarks are moving.

FIG. 22 illustrates a situation in which the landmarks are moving. When the landmarks move together, there is no change to the localization method. When the landmarks move separately, the one or more processors may provide relative distances, with shape constraints. The one or more processors may maintain non-collinear points, and may maintain a non-equilateral triangle configuration of the landmarks, such as an isosceles triangle.

Figure 23:
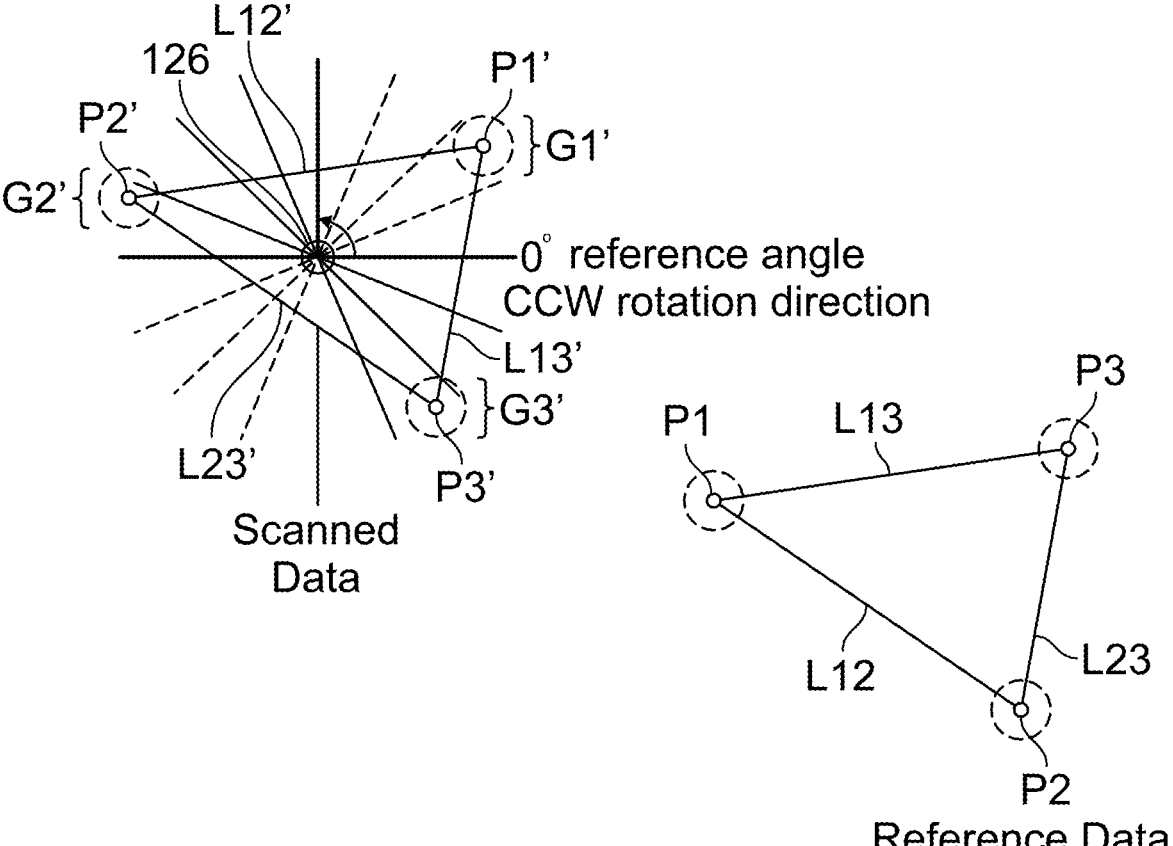
FIG. 23 illustrates a method of determining an order of landmark groups, according to an example of the present disclosure.

FIG. 23 illustrates a method of determining an order of landmark groups, according to an example of the present disclosure. The order in which the scanner 126 encounters the three landmark groups 420 is numbered G1', G2', and G3'. The center finding method(s) can then be used to determine the appropriate center positions P1', P2', and P3' for each of these groups. The distances L12', L23', and L13' between the found centers P1', P2', and P3' are then compared to the known reference center distances L12, L23, and L13. From this comparison the mapping between the found and reference points can be determined. FIG. 23 shows the mapping for the example case: P1'→P3, P2' →P1, P3'-P2.

Figure 24:
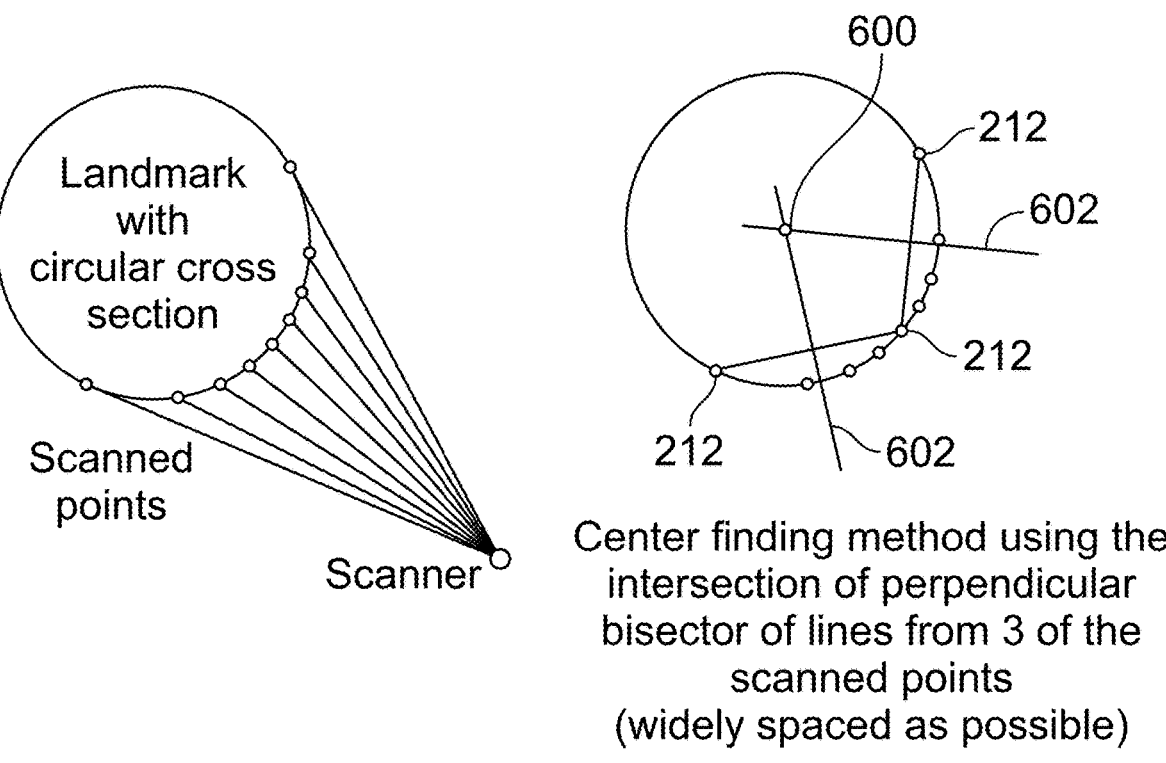
FIG. 24 illustrates that the localization systems and methods can be used to find centers of circular landmarks.

FIG. 24 illustrates that the localization systems and methods described herein can also be used to find centers of circular landmarks. The circular landmarks may be objects with circular cross section in the scanned environment. A center-finding method uses the intersection 600 of perpendicular bisector lines 602 determined from three of the scanned points 212. The scanned points 212 may be widely spaced apart (e.g., as widely spaced as possible).

Figure 25:
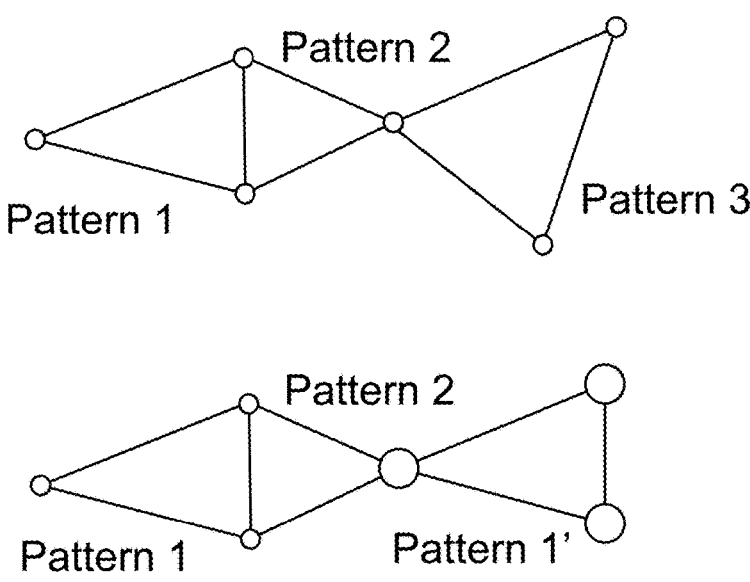
FIG. 25 illustrates multiple patterns in series.

FIG. 25 illustrates multiple patterns in series. To expand the physical area that may be covered, it is possible to position sets of landmarks so that they are encountered in series. Adjacent patterns share a common landmark. The pattern can be repeated with different sized landmarks, to differentiate one use of the pattern from other uses of the pattern.

Figure 26:
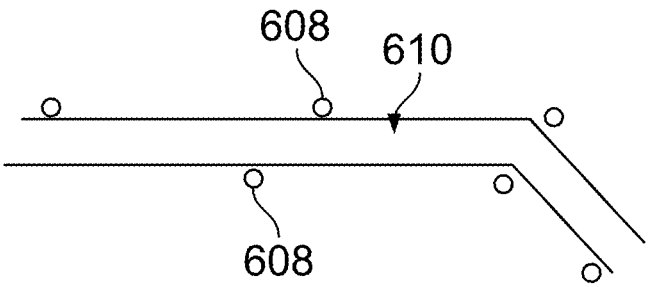
FIG. 26 illustrates another embodiment in which landmarks are disposed along a corridor.

FIG. 26 illustrates another embodiment in which landmarks 608 are disposed along a corridor 610 or path. Existing environmental elements can be used as the landmarks. As an example, robotic navigation can be used in factory using facilities elements (beams, pillars, cabinets, fixed-position trash cans, etc.). Using deliberately placed landmarks, a specific area may be set up indoors or outdoors for tracking of movement on a planar surface (or substantially planar surface). The mobile inspection platform can navigate along a corridor or another specified path. In multi-platform (e.g., multi-robot) applications, mobile inspection platforms may send current locations to other mobile inspection platforms or a central server. The location data that is communicated may be used to navigate other mobile inspection platforms from landmarks.

Figure 27:
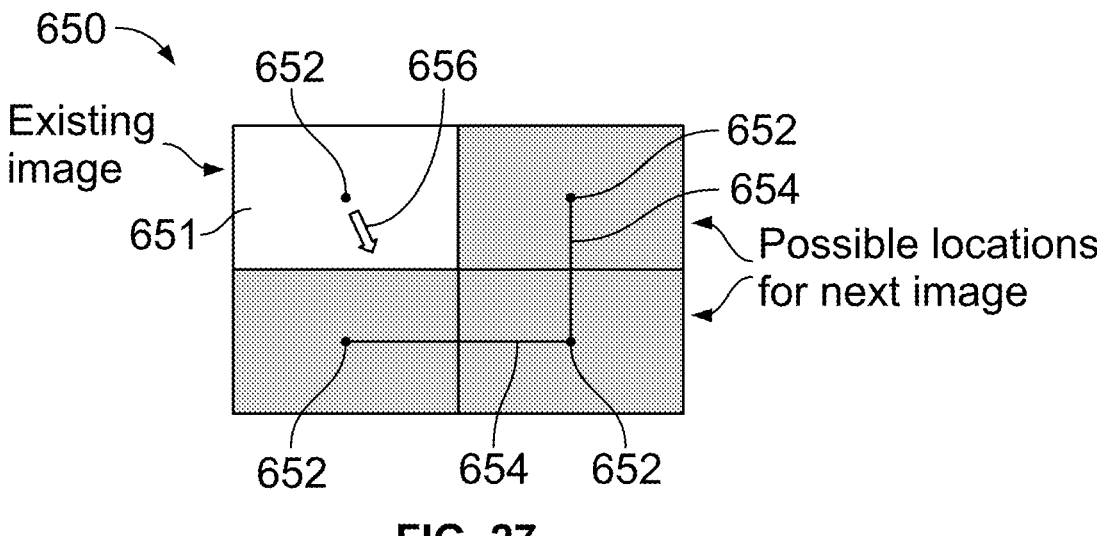
FIG. 27 illustrates a diagram of an image and possible locations for a subsequent image for automatic data capture.

FIG. 27 illustrates a diagram 650 of an image 651 and possible locations for a subsequent image for automatic data capture. During capture, a distance from current location of the capture platform to the prior image capture location is computed, and when the platform is within a threshold of the target region, a signal is sent to the motion platform controller to stop and acquire a new image. This process enables a way to automatically capture appropriately spaced images. FIG. 27 shows a capture location analysis using a Minkowski sum, with the image center points 652 and threshold boundaries 654, as well as the motion direction 656.

In relation to inspection of the underside of an aircraft (on the ground), the method may include automatic acquisition of the image data from a motion platform (like a mobile robot) and embedding the location data and time of capture in the EXIF metadata section of the images. The method also includes automatic placement of images in a graphical display environment based on embedded image location data. A user interacts with image datasets on a graphical display selecting location and time of capture.

Figure 28:
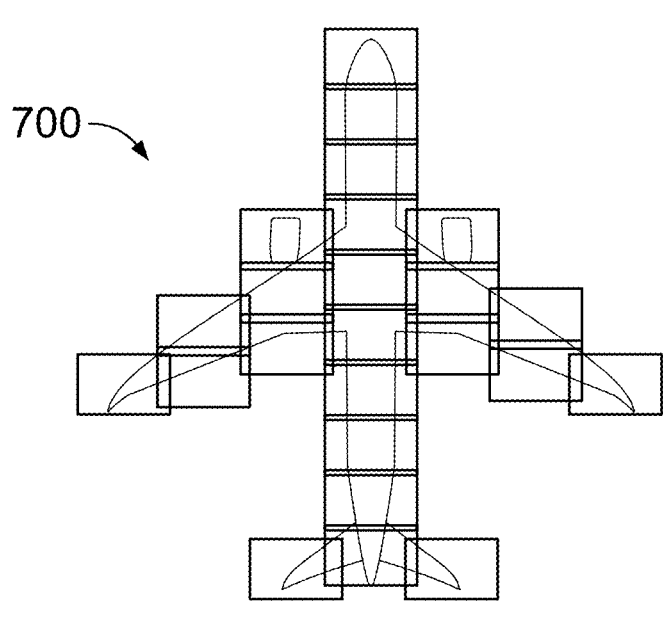
FIG. 28 illustrates an image mosaic according to an embodiment.

FIG. 28 illustrates an image mosaic 700 according to an embodiment. Images can be automatically placed. Location data can be embedded in the images, so that there is no need to keep a separate database of location. Time of capture can also be embedded in each image. The images can be automatically placed in appropriate location (position and orientation) using the position and orientation data stored in the image metadata (e.g. the location data stored in the EXIF part of the image file). The mosaic may be displayed in a user interface mock-up. Using the user interface, a user can select the current image to zoom in or select from a series of other images in the same location, but acquired at different times. This allows for both spatial (location) and temporal (acquisition time) analysis of the images for inspection and comparison to prior capture events. The benefits of such method include: an automatable way to capture appropriately spaced image data; an automatable way to create the mosaic (image positioning and alignment); an efficient way of managing the collected image datasets—both spatially and temporally; and a more intuitive user interface for technicians who will use the images data for inspection analysis.

As described herein, examples of the present disclosure provide accurate and robust tracking methods that are not dependent on GPS, and do not require environmental preparation (such as placing markers of tags), such as in relation to a stand-alone tracking capability and/or to augment other types of tracking.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 116 may be or include one or more processors that are configured to control operation of the localization system 101, as described herein.

The control unit 116 is configured to execute a set of instructions that are stored in one or more data storage units or elements (such as one or more memories), in order to process data. For example, the control unit 116 may include or be coupled to one or more memories. The data storage units may also store data or other information as desired or needed. The data storage units may be in the form of an information source or a physical memory element within a processing machine. The set of instructions may include various commands that instruct the control unit 116 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

Clause 1. A method comprising:
   detecting a plurality of landmarks in scan data acquired by a scanning sensor disposed onboard a mobile inspection platform;
   determining, via one or more processors, centers of the landmarks based on scan points in the scan data that impinge perimeter surfaces of the landmarks; and determining a location of the mobile inspection platform in relation to the centers of the landmarks.

Clause 2. The method of Clause 1, wherein the landmarks include landing gear of an aircraft.

Clause 3. The method of Clause 1 or Clause 2, wherein determining the centers of the landmarks comprises:
   grouping the scan points into different groups based on proximity;
   converting the scan points in each group into one or more line segments; and
   determining one or more sets of parallel line segments among the different groups.

Clause 4. The method of Clause 3, further comprising:
   matching the one or more sets of parallel line segments to designated patterns associated with different regions in a surrounding environment that includes the landmarks; and
   determining a best-matching pattern of the designated patterns.

Clause 5. The method of Clause 4, further comprising:
   determining offsets based on the best-matching pattern; and
   applying the offsets to mid-points of the one or more line segments to determine the centers of the landmarks.

Clause 6. The method of Clause 3, further comprising determining an occlusion state of the sensor based on a number of the parallel line segments in each of the one or more sets of parallel line segments.

Clause 7. The method of Clause 6, wherein determining the location of the mobile inspection platform comprises selecting a localization algorithm based on the occlusion state of the sensor, and inputting the centers of the landmarks into the localization algorithm that is selected.

Clause 8. The method of any of Clauses 1-7, further comprising controlling movement of the mobile inspection platform relative to the landmarks based on the location of the mobile inspection platform in relation to the centers of the landmarks.

Clause 9. The method of any of Clauses 1-8, further comprising generating the scan data by controlling the sensor to perform a full 360-degree scan of a surrounding environment that includes the landmarks.

Clause 10. A localization system comprising:
   a scanning sensor disposed on a mobile inspection platform and configured to acquire scan data of a surrounding environment; and
   one or more processors configured to analyze the scan data and detect a plurality of landmarks in the scan data, the one or more processors configured to determine centers of the landmarks based on scan points in the scan data that impinge perimeter surfaces of the landmarks, and determine a location of the mobile inspection platform in relation to the centers of the landmarks.

Clause 11. The localization system of Clause 10, wherein the sensor is a LIDAR sensor.

Clause 12. The localization system of Clause 10 or Clause 11, wherein the landmarks include landing gear of an aircraft.

Clause 13. The localization system of any of Clauses 10-12, wherein the one or more processors are configured to determine the centers of the landmarks by:
   grouping the scan points into different groups based on proximity;
   converting the scan points in each group into one or more line segments; and
   determining one or more sets of parallel line segments among the different groups.

Clause 14. The localization system of Clause 13, wherein the one or more processors are configured to determine the centers of the landmarks by:

matching the one or more sets of parallel line segments to designated patterns associated with different regions in the surrounding environment; and determining a best-matching pattern of the designated patterns.

Clause 15. The localization system of Clause 14, wherein the one or more processors are configured to determine the centers of the landmarks by:

determining offsets based on the best-matching pattern; and applying the offsets to mid-points of the one or more line segments to determine the centers of the landmarks.

Clause 16. The localization system of Clause 13, wherein the one or more processors are configured to:

determine an occlusion state of the sensor based on a number of the parallel line segments in each of the one or more sets of parallel line segments; and determine the location of the mobile inspection platform by selecting a localization algorithm based on the occlusion state of the sensor and inputting the centers of the landmarks into the localization algorithm that is selected.

Clause 17. The localization system of any of Clauses 10-16, wherein the landmarks have a circular cross-sectional shape, and the one or more processors are configured to determine the respective center of each corresponding landmark by:

determining a first line between a first scan point in the scan data and a second scan point in the scan data;

determining a second line between the second scan point and a third scan point in the scan data; and determining the respective center as a point of intersection between a first perpendicular bisector line of the first line and a second perpendicular bisector line of the second line.

Clause 18. The localization system of any of Clauses 10-17, wherein the one or more processors are configured to control movement of the mobile inspection platform relative to the landmarks based on the location of the mobile inspection platform in relation to the centers of the landmarks.

Clause 19. The localization system of any of Clauses 10-18, wherein the one or more processors are configured to control the scanning sensor to acquire the scan data by performing a full 360-degree scan of the surrounding environment.

Clause 20. A localization system comprising:

a scanning sensor disposed on a mobile inspection platform and configured to acquire scan data of a surrounding environment; and one or more processors configured to:

detect a plurality of landmarks in the scan data based on scan points in the scan data that impinge perimeter surfaces of the landmarks;

group the scan points into different groups based on proximity;

convert the scan points in each group into one or more line segments;

determine a set of parallel line segments among the different groups;

match the set of parallel line segments to a first designated pattern of multiple designated patterns associated with different regions in the surrounding environment;

determine offsets based on the first designated pattern;

apply the offsets to mid-points of the one or more line segments to determine centers of the landmarks; and determine a location of the mobile inspection platform in relation to the centers of the landmarks.

It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 116 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
   detecting a plurality of landmarks in scan data acquired by a scanning sensor disposed onboard a mobile inspection platform;
   determining, via one or more processors, centers of the landmarks based on scan points in the scan data that impinge perimeter surfaces of the landmarks, wherein determining the centers of the landmarks comprises:
      grouping the scan points into different groups based on proximity;
      converting the scan points in each group into one or more line segments; and
      determining one or more sets of parallel line segments among the different groups; and
   determining a location of the mobile inspection platform in relation to the centers of the landmarks.

2. The method of claim 1, wherein the landmarks include landing gear of an aircraft.

3. The method of claim 1, further comprising:
   matching the one or more sets of parallel line segments to designated patterns associated with different regions in a surrounding environment that includes the landmarks; and
   determining a best-matching pattern of the designated patterns.

4. The method of claim 3, further comprising:
   determining offsets based on the best-matching pattern; and
   applying the offsets to mid-points of the one or more line segments to determine the centers of the landmarks.

5. The method of claim 1, further comprising determining an occlusion state of the sensor based on a number of the parallel line segments in each of the one or more sets of parallel line segments.

6. The method of claim 5, wherein determining the location of the mobile inspection platform comprises selecting a localization algorithm based on the occlusion state of the sensor, and inputting the centers of the landmarks into the localization algorithm that is selected.

7. The method of claim 1, further comprising controlling movement of the mobile inspection platform relative to the landmarks based on the location of the mobile inspection platform in relation to the centers of the landmarks.

8. The method of claim 1, further comprising generating the scan data by controlling the sensor to perform a full 360-degree scan of a surrounding environment that includes the landmarks.

9. A localization system comprising:
   a scanning sensor disposed on a mobile inspection platform and configured to acquire scan data of a surrounding environment; and one or more processors configured to analyze the scan data and detect a plurality of landmarks in the scan data, the one or more processors configured to determine centers of the landmarks based on scan points in the scan data that impinge perimeter surfaces of the landmarks, and determine a location of the mobile inspection platform in relation to the centers of the landmarks,
   wherein the one or more processors are configured to determine the centers of the landmarks by:
      grouping the scan points into different groups based on proximity;
      converting the scan points in each group into one or more line segments; and
      determining one or more sets of parallel line segments among the different groups.

10. The localization system of claim 9, wherein the sensor is a LIDAR sensor.

11. The localization system of claim 9, wherein the landmarks include landing gear of an aircraft.

12. The localization system of claim 9, wherein the one or more processors are configured to determine the centers of the landmarks by:
   matching the one or more sets of parallel line segments to designated patterns associated with different regions in the surrounding environment; and
   determining a best-matching pattern of the designated patterns.

13. The localization system of claim 12, wherein the one or more processors are configured to determine the centers of the landmarks by:
   determining offsets based on the best-matching pattern; and
   applying the offsets to mid-points of the one or more line segments to determine the centers of the landmarks.

14. The localization system of claim 9, wherein the one or more processors are configured to:
   determine an occlusion state of the sensor based on a number of the parallel line segments in each of the one or more sets of parallel line segments; and
   determine the location of the mobile inspection platform by selecting a localization algorithm based on the occlusion state of the sensor and inputting the centers of the landmarks into the localization algorithm that is selected.

15. The localization system of claim 9, wherein the landmarks have a circular cross-sectional shape, and the one or more processors are configured to determine the respective center of each corresponding landmark by:
   determining a first line between a first scan point in the scan data and a second scan point in the scan data;
   determining a second line between the second scan point and a third scan point in the scan data; and
   determining the respective center as a point of intersection between a first perpendicular bisector line of the first line and a second perpendicular bisector line of the second line.

16. The localization system of claim 9, wherein the one or more processors are configured to control movement of the mobile inspection platform relative to the landmarks based on the location of the mobile inspection platform in relation to the centers of the landmarks.

17. The localization system of claim 9, wherein the one or more processors are configured to control the scanning sensor to acquire the scan data by performing a full 360-degree scan of the surrounding environment.

18. A localization system comprising:

a scanning sensor disposed on a mobile inspection platform and configured to acquire scan data of a surrounding environment; and one or more processors configured to:

detect a plurality of landmarks in the scan data based on scan points in the scan data that impinge perimeter surfaces of the landmarks;

group the scan points into different groups based on proximity;

convert the scan points in each group into one or more line segments;

determine a set of parallel line segments among the different groups;

match the set of parallel line segments to a first designated pattern of multiple designated patterns associated with different regions in the surrounding environment;

determine offsets based on the first designated pattern;

apply the offsets to mid-points of the one or more line segments to determine centers of the landmarks; and determine a location of the mobile inspection platform in relation to the centers of the landmarks.

19. A localization system comprising:

a scanning sensor disposed on a mobile inspection platform and configured to acquire scan data of a surrounding environment; and one or more processors configured to analyze the scan data and detect a plurality of landmarks in the scan data, the one or more processors configured to determine centers of the landmarks based on scan points in the scan data that impinge perimeter surfaces of the landmarks, and determine a location of the mobile inspection platform in relation to the centers of the landmarks, wherein the landmarks have a circular cross-sectional shape, and the one or more processors are configured to determine the respective center of each corresponding landmark by:

determining a first line between a first scan point in the scan data and a second scan point in the scan data;

determining a second line between the second scan point and a third scan point in the scan data; and determining the respective center as a point of intersection between a first perpendicular bisector line of the first line and a second perpendicular bisector line of the second line.

20. The localization system of claim 19, wherein the landmarks include landing gear of an aircraft.

* * * * *